US012573757B2

(12) United States Patent
Yoshida et al.

(10) Patent No.: US 12,573,757 B2
(45) Date of Patent: Mar. 10, 2026

(54) PHASE SHIFT DEVICE, PLANAR ANTENNA DEVICE, AND METHOD FOR MANUFACTURING PHASE SHIFT DEVICE

(71) Applicant: NEC Corporation, Tokyo (JP)

(72) Inventors: Kohei Yoshida, Tokyo (JP); Ryota Nihei, Tokyo (JP); Kenji Wakafuji, Tokyo (JP); Koya Takata, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 60 days.

(21) Appl. No.: 18/730,492

(22) PCT Filed: Mar. 10, 2022

(86) PCT No.: PCT/JP2022/010627
§ 371 (c)(1),
(2) Date: Jul. 19, 2024

(87) PCT Pub. No.: WO2023/170872
PCT Pub. Date: Sep. 14, 2023

(65) Prior Publication Data
US 2025/0149790 A1 May 8, 2025

(51) Int. Cl.
*H01Q 21/06* (2006.01)
*H01Q 9/04* (2006.01)

(52) U.S. Cl.
CPC ......... *H01Q 9/0407* (2013.01); *H01Q 21/065* (2013.01)

(58) Field of Classification Search
None
See application file for complete search history.

(56) References Cited

U.S. PATENT DOCUMENTS 11,664,606 B2 * 5/2023 Chen ...................... H01Q 7/005 343/893
2021/0005979 A1 * 1/2021 Chiu ........................ H01Q 1/38
(Continued)

FOREIGN PATENT DOCUMENTS

JP H01-162001 6/1989
JP H04-273601 9/1992
(Continued)

OTHER PUBLICATIONS

International Search Report for PCT Application No. PCT/JP2022/010627, mailed on Jun. 14, 2022.
(Continued)

*Primary Examiner* — Wilson Lee
(74) *Attorney, Agent, or Firm* — Sughrue Mion, PLLC

(57) ABSTRACT

A planar antenna device that includes a first substrate having a patch antenna, a dielectric, and a second substrate. The second substrate includes a matrix circuit including a transistor pair including a first thin-film transistor and a second thin-film transistor, a first signal line to which a signal to be transmitted is input, a phase shift element including a plurality of phase shift wires, a second signal line electromagnetically coupled to the patch antenna via the slot, and a switch group configured by a first switching element having a first end of a channel connected to one end of the plurality of phase shift wires and a control electrode connected to the first thin-film transistor, and a second switching element having a first end of the channel connected to the other end of the plurality of phase shift wires and a control electrode connected to the second thin-film transistor.

10 Claims, 19 Drawing Sheets

(56) References Cited

U.S. PATENT DOCUMENTS

| | | | | |
|---|---|---|---|---|
| 2021/0135374 | A1* | 5/2021 | Tsai | H01Q 21/0006 |
| 2022/0037785 | A1* | 2/2022 | Okita | H01Q 21/0006 |

FOREIGN PATENT DOCUMENTS

| | | |
|---|---|---|
| JP | 2014-531843 A | 11/2014 |
| JP | 2021-013071 | 2/2021 |
| WO | 2019/189151 | 10/2019 |
| WO | 2021/085281 | 5/2021 |

OTHER PUBLICATIONS

English translation of Written opinion for PCT Application No. PCT/JP2022/010627, mailed on Jun. 14, 2022.

* cited by examiner

PHASE SHIFT DEVICE, PLANAR ANTENNA DEVICE, AND METHOD FOR MANUFACTURING PHASE SHIFT DEVICE

This application is a National Stage Entry of PCT/JP2022/010627 filed on Mar. 10, 2022, the contents of all of which are incorporated herein by reference, in their entirety.

TECHNICAL FIELD

The present disclosure relates to a phase shift device and the like mounted on a planar antenna device.

BACKGROUND ART

Planar antennas responding to radio waves in a high frequency band are being developed for mobile communication after the fifth-generation mobile communication (5G). In a general planar antenna, a digital integrated circuit for phase shift is mounted on a patch antenna on a printed circuit board to form an antenna. As the frequency band of the radio wave to be transmitted and received becomes higher, the related digital integrated circuit becomes more expensive. In a case where a general planar antenna is applied to mobile communication after 5G, since several tens to several thousands of digital integrated circuits are included, the planar antenna becomes very expensive.

PTL 1 discloses a planar phase array antenna. The phase array antenna of PTL 1 includes a batch antenna array, a phase shifter, a static network, and a bias network. The phase shifter included in the phase array antenna of PTL 1 is mounted in a spiral shape. The phase shifter included in the phase array antenna of PTL 1 is electronically steerable.

CITATION LIST

Patent Literature

PTL 1: JP 2014-531843 A

SUMMARY OF INVENTION

Technical Problem

The phase array antenna of PTL 1 can be manufactured using a manufacturing process of a liquid crystal display. A planar antenna applicable to mobile communication after 5G can be manufactured at low cost by using the phase array antenna of PTL 1. In the phase array antenna of PTL 1, a phase shift is achieved using a dielectric constant change of liquid crystal. In the phase array antenna of PTL 1, it takes time to switch the beam direction due to the operation speed of the liquid crystal. Therefore, it is difficult to apply the phase array antenna of PTL 1 as it is to mobile communication after 5G in which high-speed switching is required. In addition, the phase array antenna of PTL 1 has a gain smaller than that of a general planar antenna. Therefore, it is difficult for the phase array antenna of PTL 1 to secure a sufficient bandwidth.

An object of the present disclosure is to provide a planar antenna device or the like capable of switching a phase of a signal to be transmitted at high speed while securing a sufficient bandwidth.

Solution to Problem

A planar antenna device according to one aspect of the present disclosure includes a first substrate having a patch antenna disposed on an upper surface and a ground layer in which a slot is formed in a lower region of the patch antenna disposed on a lower surface, a dielectric layer disposed such that an upper surface comes into contact with the ground layer disposed on the lower surface of the first substrate, and a second substrate disposed in contact with the lower surface of the dielectric layer. The second substrate includes a matrix circuit including a transistor pair including a first thin-film transistor and a second thin-film transistor, a first signal line formed on an upper surface of the second substrate and to which a signal to be transmitted is input, a phase shift element formed on an upper surface of the second substrate and including a plurality of phase shift wires, a second signal line formed on an upper surface of the second substrate, disposed below the slot, and electromagnetically coupled to the patch antenna via the slot, and a switch group configured by a first switching element having a first end of a channel connected to one end of the plurality of phase shift wires and a control electrode connected to the first thin-film transistor, and a second switching element having a first end of the channel connected to the other end of the plurality of phase shift wires and a control electrode connected to the second thin-film transistor.

A phase shift device according to one aspect of the present disclosure includes a matrix circuit including a transistor pair configured by a first thin-film transistor and a second thin-film transistor, a phase shift element including a plurality of phase shift wires, and a switch group including a first switching element having a first end of a channel connected to one end of any of the plurality of phase shift wires and a control electrode connected to the first thin-film transistor, and a second switching element having a first end of a channel connected to the other end of any of the plurality of phase shift wires and a control electrode connected to the second thin-film transistor.

A method for manufacturing a phase shift device according to one aspect of the present disclosure includes forming a matrix circuit including a transistor pair configured by a first thin-film transistor and a second thin-film transistor using a thin-film transistor manufacturing process technology, forming a phase shift element including a plurality of phase shift wires above the matrix circuit, and forming a switch group including a first switching element having a first end of a channel connected to one end of any of the plurality of phase shift wires and a control electrode connected to the first thin-film transistor, and a second switching element having a first end of a channel connected to the other end of any of the plurality of phase shift wires and a control electrode connected to the second thin-film transistor using a micro-LED display manufacturing process technology.

Advantageous Effects of Invention

According to the present disclosure, a planar antenna device or the like capable of switching a phase of a signal to be transmitted at high speed while securing a sufficient bandwidth can be provided.

EXAMPLE EMBODIMENT

Figure 1:
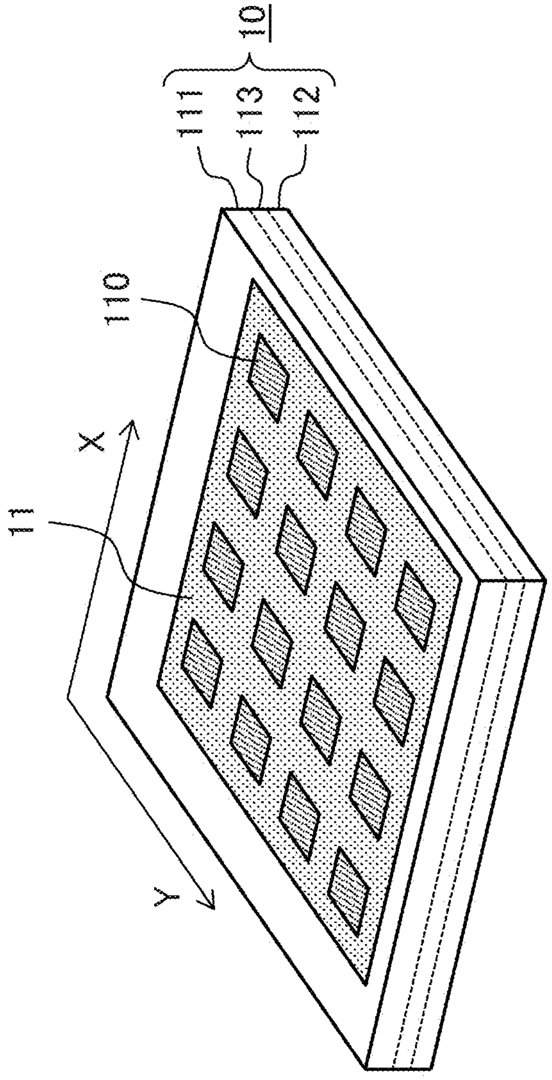
FIG. 1 is a conceptual diagram illustrating an example of an external appearance of a planar antenna device according to a first example embodiment.

Hereinafter, example embodiments of the present invention will be described with reference to the drawings. However, the example embodiments described below have technically preferable limitations for carrying out the present invention, but the scope of the invention is not limited to the following. In all the drawings used in the following description of the example embodiments, the same reference numerals are given to the same parts unless there is a particular reason. Furthermore, in the following example embodiments, repeated description of similar configurations/operations may be omitted.

First Example Embodiment

First, a planar antenna device according to a first example embodiment will be described with reference to the drawings. The planar antenna device of the present example embodiment includes a phase shift element formed using a manufacturing process technology of a micro light emitting diode (LED) display. In addition, the planar antenna device of the present example embodiment includes a switching element formed using a manufacturing process technology of a thin-film transistor (TFT). That is, the planar antenna device of the present example embodiment is manufactured by combining a manufacturing process technology of a micro-LED display (also referred to as a micro-LED process technology) and a manufacturing process technology of a thin-film transistor (also referred to as a TFT process technology).

Hereinafter, an example in which a transmission target radio wave is transmitted from the planar antenna device will be described. The planar antenna device can also be applied to reception of a radio wave to be received coming from the outside. Furthermore, in the following description, description on a transmission device for transmitting a radio wave from the planar antenna device and a reception device for receiving a radio wave received by the planar antenna device will be omitted. For example, the planar antenna device of the present example embodiment is configured to respond to radio waves in a high frequency band used in mobile communication after the fifth-generation mobile communication (5G).

(Configuration)

FIG. 1 is a conceptual diagram illustrating an example of an external appearance of a planar antenna device 10 according to the present example embodiment. The planar antenna device 10 includes a first substrate 111, a second substrate 112, and a dielectric layer 113. The planar antenna device 10 has a structure in which the first substrate 111, the second substrate 112, and the dielectric layer 113 are stacked. The first substrate 111 may be integrated with the dielectric layer 113. In that case, the material of the dielectric layer 113 may be applied to the material of the first substrate 111.

The first substrate 111 includes a transmission surface of the transmission target radio wave. The patch antenna array 11 is arranged on the first surface (transmission surface) of the first substrate 111. The patch antenna array 11 includes a plurality of patch antennas 110. A ground layer (described later) is formed on the second surface of the first substrate 111 facing the first surface. For example, the material of the first substrate 111 is silicon or glass. The first substrate 111 may be made of a material other than silicon or glass as long as the transmission target radio wave can be transmitted.

The second substrate 112 corresponds to a backplane of a liquid crystal display. A matrix circuit is formed on the upper surface of the second substrate 112. The matrix circuit has a structure in which a plurality of thin-film transistors (TFT) are arranged in a two-dimensional array. The TFTs included in the matrix circuit are formed using a TFT process technology. In addition, a signal layer is formed above the matrix circuit. In the signal layer, a phase shift wire constituting a phase shift element, a switch group including a plurality of switching elements, a signal line connecting the phase shift wire, the switch group, and the like are formed. The switching elements are formed using micro-LED process technology. For example, the material of the second substrate 112 is silicon or glass. The second substrate 112 may be made of a material other than silicon or glass as long as the transmission target radio wave can be transmitted.

The dielectric layer 113 is sandwiched between the first substrate 111 and the second substrate 112. The dielectric layer 113 is made of a dielectric material having a specific dielectric constant. The dielectric constant of the dielectric layer 113 is selected according to the transmission target radio wave. The dielectric layer 113 may be integrated with the first substrate 111.

An antenna having a function of a phase shifter is formed by sandwiching the dielectric layer 113 between the first substrate 111 and the second substrate 112 facing each other. A single antenna (also referred to as an antenna unit) is configured for each patch antenna 110. The function of the phase shifter is expressed for each antenna unit. That is, a phase shift element is configured for each antenna unit.

Figure 2:
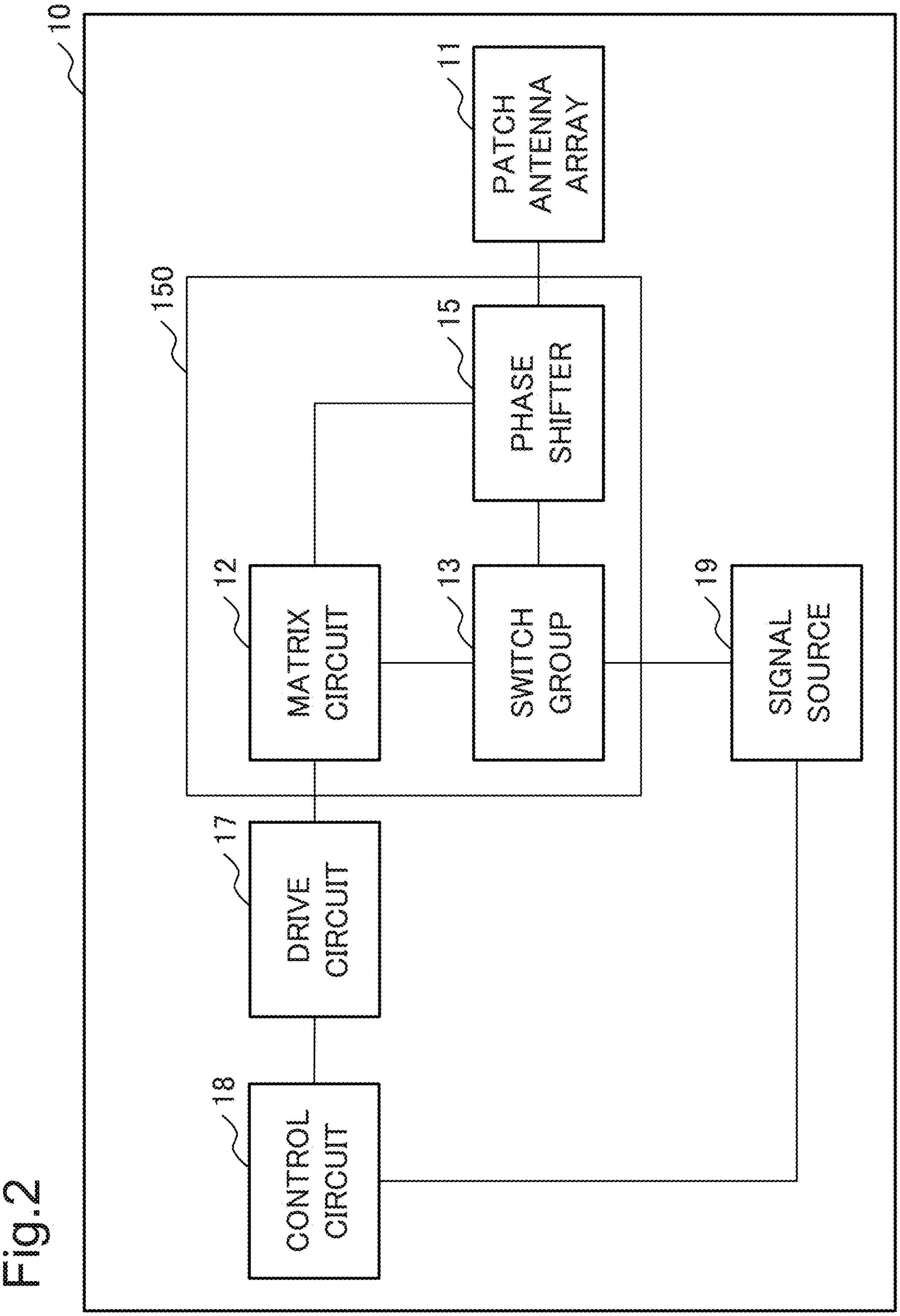
FIG. 2 is a block diagram illustrating an example of a configuration of a planar antenna device according to the first example embodiment.

FIG. 2 is a block diagram illustrating an example of a configuration of the planar antenna device 10. The planar antenna device 10 includes a patch antenna array 11, a matrix circuit 12, a switch group 13, a phase shifter 15, a drive circuit 17, a control circuit 18, and a signal source 19. The matrix circuit 12, the switch group 13, and the phase shifter 15 constitute a phase shift device 150.

The patch antenna array 11 includes a plurality of patch antennas 110. The plurality of patch antennas 110 are arrayed in a two-dimensional array. In the example of FIG. 2, the plurality of patch antennas 110 are arrayed along the X direction and the Y direction. The plurality of patch antennas 110 are phased arrayed.

The patch antenna 110 is a plate-shaped radiation element. In the example of FIG. 1, the patch antenna 110 has a square shape. The shape of the patch antenna 110 is not limited to a square shape, and may be a circular shape or other shapes. The patch antenna 110 is power fed by electromagnetic coupling power feeding method. An opening (also referred to as a slot) is opened in the ground layer below the patch antenna 110. The patch antenna 110 is electromagnetically coupled to a signal line (microstrip line) formed on the upper surface side of the second substrate 112 by way of the slot of the ground layer. The patch antenna 110 is excited by electromagnetically coupling the patch antenna 110 and the microstrip line via the slot. The impedance can be matched by opening the open end of the microstrip line at a position separated by about ¼ of the wavelength of the radio wave to be transmitted from immediately below the slot and adjusting the dimension of the slot. For example, the shape of the slot is rectangular. For example, the shape of the slot may be a shape other than a rectangle, such as a dog-bone shape. The patch antenna 110 and the microstrip line may be electromagnetically coupled by proximity coupling power feeding without passing through a slot.

The patch antenna 110 is an open type resonator having a structure equivalent to that of a microstrip line whose both ends are opened. The patch antenna 110 resonates at a frequency whose length matches an integral multiple of ½ wavelength. The size of the patch antenna 110 is set according to the wavelength of the transmission target radio wave. Since the patch antenna 110 is an open type resonator that resonates at a resonance frequency, the Q factor decreases due to radio wave radiation. In order to avoid a decrease in the Q factor due to radio wave radiation and operate the patch antenna 110 as a resonator, the dielectric constant of the material of the dielectric layer 113 is preferably high. When the material of the dielectric layer 113 has a high dielectric constant, the thickness of the dielectric layer 113 and the width of the patch antenna 110 are set to be sufficiently small with respect to the wavelength of the transmission target radio wave. For example, when the material of the dielectric layer 113 has a low dielectric constant, a microstrip antenna can be configured by increasing the thickness of the dielectric layer 113 and the width of the patch antenna 110 with respect to the wavelength of the transmission target radio wave to increase the radiation amount.

The matrix circuit 12 has a configuration in which a plurality of thin-film transistors (TFT) are arrayed in a two-dimensional array. The matrix circuit 12 is formed on the upper surface of the second substrate 112 using a TFT process technology. A shield layer (described later) is formed above the matrix circuit 12. Each of the plurality of TFTs is associated to any of the plurality of patch antennas 110 constituting the patch antenna array 11. For example, the TFT includes a semiconductor layer such as amorphous silicon or polysilicon.

The switch group 13 includes a plurality of switching elements. The plurality of switching elements are formed above the region where the matrix circuit 12 is formed using a micro-LED process technology (device transfer technology). The plurality of switching elements are connected to signal lines and phase shift wires included in a signal layer formed above a shield layer (described later). Any one of the plurality of TFTs is connected to each of the plurality of switching elements. A plurality of phase shift wires constituting a phase shift element of each antenna unit is arranged between the TFTs associated to the patch antennas 110.

For example, the switching element is achieved by a field effect transistor (FET). When the switching element is achieved by an FET, a TFT is connected to a gate electrode (also referred to as a control electrode) of the FET. For example, the switching element may be achieved by a positive intrinsic semiconductor negative (PIN) diode. For example, the switching element is made of a semiconductor material such as silicon (Si), gallium arsenide (GaAs), or gallium nitride (GaN).

The phase shifter 15 includes a phase shift element formed for each antenna unit. The phase shift element of each antenna unit includes a plurality of phase shift wires. The plurality of phase shift wires are arranged in parallel. End portions of the plurality of phase shift wires are connected to any switch included in the switch group 13. A phase shift condition of the phase shift element for each antenna unit is set by switching the connection state of the plurality of phase shift wires. One of the switches constituting the switch group 13 is connected to both ends of each phase shift wire. At least one phase shift wire of the plurality of phase shift wires is selected by turning ON/OFF the switches connected to both ends of each phase shift wire.

The drive circuit 17 drives the plurality of TFTs constituting the matrix circuit 12 under the control of the control circuit 18. The drive circuit 17 individually drives the plurality of TFTs arrayed in a two-dimensional array.

Figure 3:
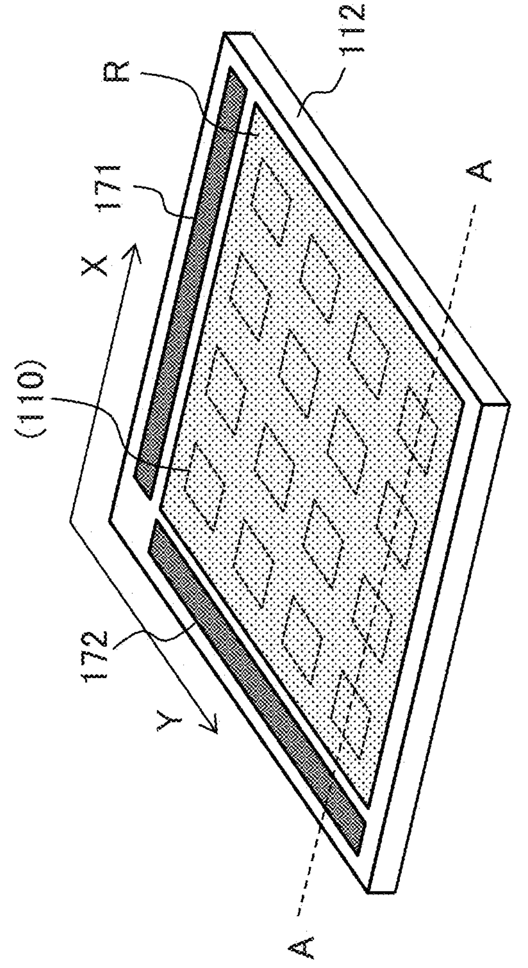
FIG. 3 is a conceptual diagram illustrating an example of a drive circuit formed on a second substrate included in the planar antenna device according to the first example embodiment.

FIG. 3 is a conceptual diagram illustrating an example of the drive circuit 17 formed on the second substrate 112. In FIG. 3, the positions of the patch antennas arranged on the first substrate 111 facing the second substrate 112 are indicated by broken lines. The drive circuit 17 includes a first drive circuit 171 that performs addressing in the X direction and a second drive circuit 172 that performs addressing in the Y direction. An address associated to any of the patch antennas 110 can be designated by driving the first drive circuit 171 and the second drive circuit 172.

The control circuit 18 performs control to drive the drive circuit 17 in accordance with a control signal from the outside. The control circuit 18 drives the drive circuit 17 by an active matrix drive system. In addition, the control circuit 18 outputs a control signal from the outside to the signal source 19. For example, the control circuit 18 is achieved by a microcomputer or a microcontroller. For example, the control circuit 18 includes a central processing unit (CPU), a random access memory (RAM), a read only memory (ROM), a flash memory, and the like. The control circuit 18 executes control and process corresponding to a program stored in advance. The control circuit 18 executes control and process corresponding to a program according to a preset schedule and timing, an external control instruction, and the like.

The signal source 19 is connected to a plurality of switching elements constituting the switch group 13. In addition, the signal source 19 is connected to the control circuit 18. The signal source 19 acquires a control signal from the control circuit 18. The signal source 19 controls ON/OFF of the plurality of switching elements constituting the switch group 13 according to the control signal. The signal source 19 may be configured to directly receive a control signal from the outside without passing through the control circuit 18.

Figure 4:
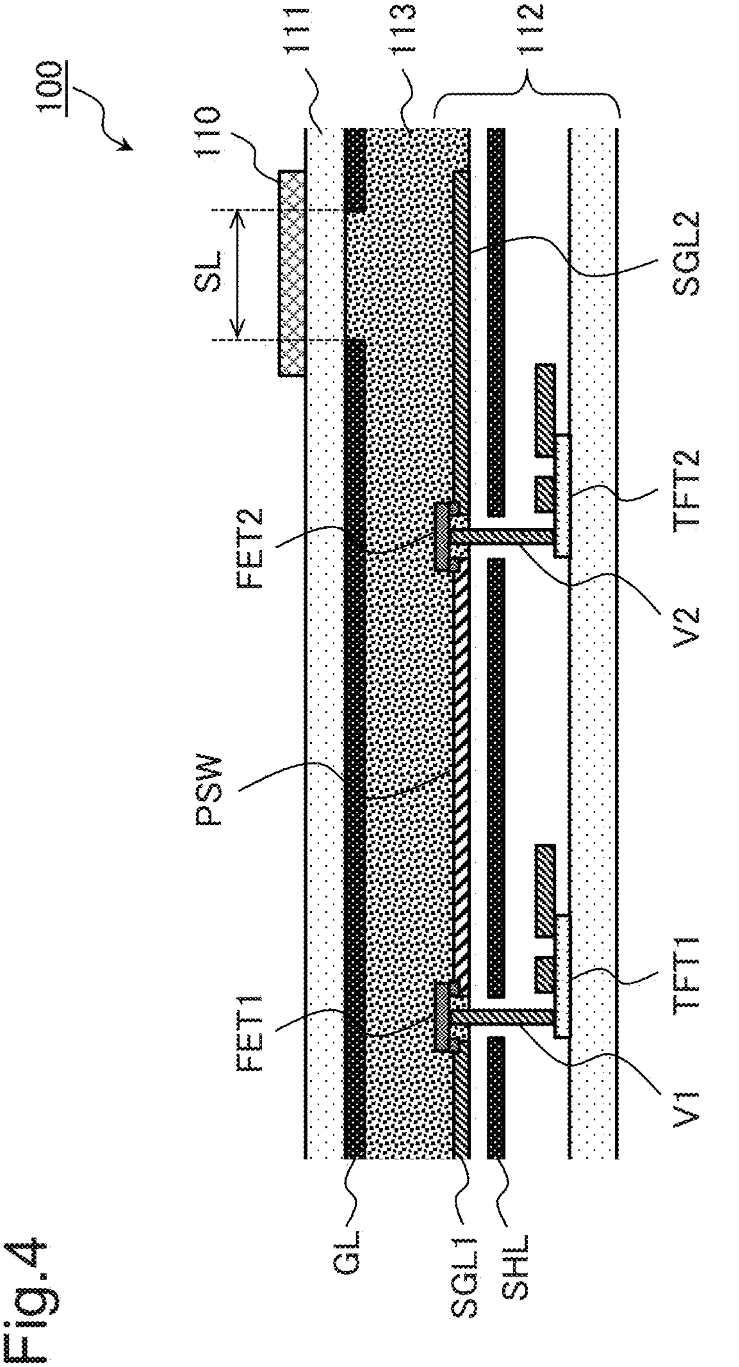
FIG. 4 is a conceptual diagram for describing an antenna unit constituting a patch antenna array included in the planar antenna device according to the first example embodiment.

FIG. 4 is a conceptual diagram for describing an antenna unit 100 constituting the patch antenna array 11. FIG. 4 is a cross-sectional view of a part of the planar antenna device 10 taken along line A-A in FIG. 1. FIG. 4 illustrates an example in which the switch is achieved by an FET.

On the second substrate 112, a plurality of TFTs (TFT1, TFT2) are formed for each antenna unit 100. The TFT1 and the TFT2 constituting the same antenna unit 100 form a pair (also referred to as a transistor pair). The TFT1 and the TFT2 constituting the matrix circuit 12 are formed on the upper surface of the second substrate 112 using a liquid crystal display manufacturing process. The TFT1 is also referred to as a first thin-film transistor. The TFT2 is also referred to as a second thin-film transistor. For example, the upper side of the matrix circuit 12 is covered with an insulating layer. An air gap may be formed above the matrix circuit 12.

A shield layer SHL is formed above the second substrate 112. The shield layer SHL is formed to prevent electromagnetic coupling of above and below the shield layer. For example, the shield layer SHL is made of a conductor. The potential of the shield layer SHL is basically a ground potential. Therefore, a capacitance corresponding to the dielectric constant of the dielectric layer 113 is formed between the shield layer SHL and the phase shift wire PSW.

A signal layer is formed above the shield layer SHL. The signal layer includes a signal line SGL1, a phase shift wire PSW, and a signal line SGL2. A signal from the signal source 19 is input to the signal line SGL1 (also referred to as a first signal line). When the connected switching element (FET1/FET2) is in the ON state, the signal input to the signal line SGL1 propagates to the phase shift wire PSW and the signal line SGL2 (also referred to as a second signal line).

A through hole for connecting the TFT1 and the FET1 and a through hole for connecting the TFT2 and the FET2 are formed in the shield layer SHL. The through hole (via hole) is formed below the FET1 and the FET2. The TFT1 and the FET1 are electrically connected by a via V1. The TFT2 and the FET2 are electrically connected by a via V2.

The FET1 (also referred to as a first switching element) is formed at the upper part of the through hole on the left side of the two through holes opened in the shield layer SHL. The FET2 (also referred to as a second switching element) is formed at the upper part of the through hole on the right side of the two through holes opened in the shield layer SHL. The FET1 and the FET2 constituting the switch group 13 are formed using the device transfer technology of the micro-LED process technology. For example, the FET1 and the FET2 are transferred to above the signal line SGL1, the signal line SGL2, the phase shift wire PSW, the via V1, and the via V2 by using the device transfer technology.

The TFT1 is connected to the gate electrode of the FET1 through a through hole (left side) opened in the shield layer SHL. The TFT2 is connected to the gate electrode of the FET2 through a through hole (right side) opened in the shield layer SHL.

A first end (right side in FIG. 4) and a second end (left side in FIG. 4) corresponding to a source or a drain are formed at both end portions of the channel of the FET1. A first end (right side) of the channel of the FET1 is connected to a first end (left side) of the phase shift wire PSW included in the phase shifter 15. A second end (left side) of the channel of the FET1 is connected to one end of the signal line SGL1. The other end of the signal line SGL1 is connected to the signal source 19.

A first end (left side in FIG. 4) and a second end (right side in FIG. 4) corresponding to a source or a drain are formed at both end portions of the channel of the FET2. A first end (left side) of the channel of the FET2 is connected to a second end (right side) of the phase shift wire PSW included in the phase shifter 15. A second end (right side) of the channel of the FET2 is connected to one end of the signal line SGL2. The other end of the signal line SGL2 extends beyond the lower region of the patch antenna 110. The signal line SGL2 functions as a microstrip line.

The dielectric layer 113 is disposed above the signal layer including the switch group 13. The first substrate 111 is disposed above the dielectric layer 113. The patch antenna 110 is disposed on the upper surface of the first substrate 111. In the example of FIG. 4, the patch antenna 110 is arranged on the right side of the upper surface of the first substrate 111. A ground layer GL is formed on the lower surface of the first substrate 111. A slot SL is opened in the ground layer GL below the patch antenna 110. The patch antenna 110 and the signal line SGL2 (microstrip line) are electromagnetically coupled through the slot SL.

The signal reaching the phase shift wire PSW through the signal line SGL1 is phase shifted by a phase shift amount corresponding to the line length of the phase shift wire PSW and the dielectric constant of the dielectric layer 113. The signal phase shifted by the phase shift wire PSW is transmitted as a radio wave in a wavelength band to be transmitted by electromagnetic induction between the signal line SGL2 and the patch antenna 210.

The radio wave received by the patch antenna 110 is received according to the capacitance based on the dielectric constant of the dielectric layer 113 between the patch antenna 110 and the signal line SGL2. The received radio wave is phase shifted by the phase shift wire PSW. The phase shifted signal is received by a reception circuit (not illustrated) through the signal line SGL1. Information included in the signal received by the reception circuit is decoded by a decoder (not illustrated). Furthermore, the radio wave transmitted from the patch antenna 110 is based on a signal output from a transmission circuit (not illustrated). The signal output from the transmission circuit reaches the phase shift wire PSW through the signal line SGL1. The signal reaching the phase shift wire PSW is phase shifted by the phase shift wire PSW and transmitted from the patch antenna 110 according to the capacitance based on the dielectric constant of the dielectric layer 113 between the patch antenna 110 and the signal line SGL2. The information included in the signal is not particularly limited.

[Phase Shift Element]

Next, a phase shift element constituting the phase shifter 15 included in the planar antenna device 10 will be described with reference to the drawings. Hereinafter, the phase shift element of each antenna unit 100 will be described with some examples.

First Example

Figure 5:
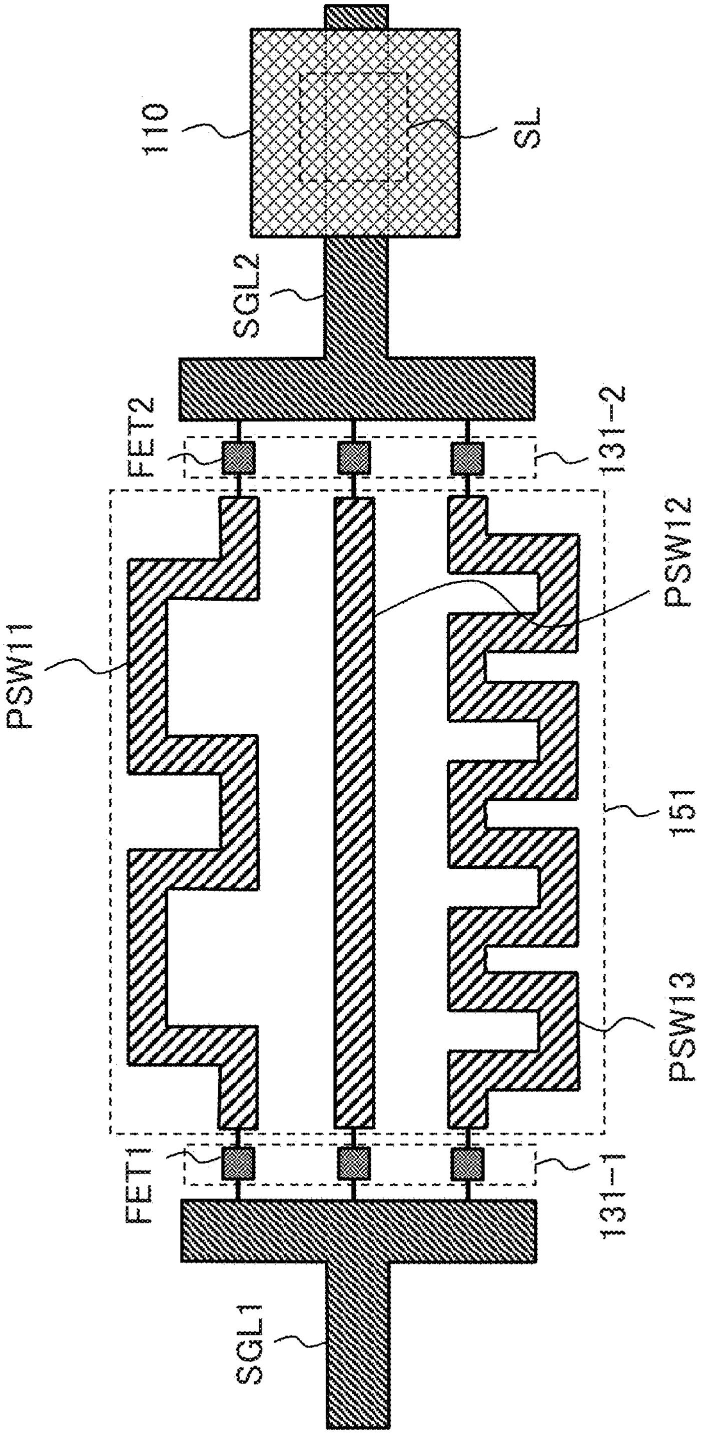
FIG. 5 is a conceptual diagram for explaining a first example of a phase shift element included in the planar antenna device according to the first example embodiment.

FIG. 5 is a conceptual diagram for explaining a first example (phase shift element 151) of a phase shift element included in the planar antenna device 10. FIG. 5 is a view of a range including the phase shift element 151 as viewed from an upper viewpoint. The dielectric constant of the dielectric layer 113 included in the planar antenna device 10 is constant. The phase shift element 151 of the first example can set the phase shift amount by selecting one of the phase shift wires PSW having different phase shift amounts.

The phase shift element 151 of the first example includes a plurality of phase shift wires (PSW11, PSW12, PSW13) having different line lengths. The line length of the phase shift wire PSW11 is longer than that of the phase shift wire PSW12. The line length of the phase shift wire PSW13 is longer than that of the phase shift wire PSW11. The lengths of the phase shift wire PSW11, the phase shift wire PSW12, and the phase shift wire PSW13 are set in accordance with the wavelength of the transmission target radio wave.

The first end (left side) of the phase shift wire PSW11 is connected to the FET1 in the upper stage included in the switch group 131-1. The first end (left side) of the phase shift wire PSW12 is connected to the FET1 in the middle stage included in the switch group 131-1. The first end (left side) of the phase shift wire PSW13 is connected to the FET1 in the lower stage included in the switch group 131-1. The FET1 included in the switch group 131-1 is connected to one end (right side) of the signal line SGL1. The second end (right side) of the phase shift wire PSW11 is connected to the FET2 in the upper stage included in the switch group 131-2. The second end (right side) of the phase shift wire PSW12 is connected to the FET2 in the middle stage included in the switch group 131-2. The second end (right side) of the phase shift wire PSW13 is connected to the FET2 in the lower stage included in the switch group 131-2. The FET2 included in the switch group 131-2 is connected to one end (left side) of the signal line SGL2. The other end (right side) of the signal line SGL2 extends beyond the lower side of the slot SL opened in association with the patch antenna 110.

The phase shift amount of the phase shift wire PSW connected to the FET1 and the FET2 set to the ON state according to the control signal from the signal source 19 is set as the phase shift amount of the phase shift element 151. A signal reaching the signal line SGL2 below the slot SL via the phase shift wire PSW connected to the FET1 and the FET2 in the ON state is transmitted as a radio wave by inductive resonance between the patch antenna 110 and the signal line SGL2. In the case of the structure of FIG. 5, since a response delay in the dielectric layer 113 does not occur, the phase can be switched at high speed. Furthermore, in the case of the structure of FIG. 5, the phase shift amount of the phase shift element 151 can be set to an appropriate value by selecting the phase shift wire PSW according to the situation.

Second Example

Figure 6:
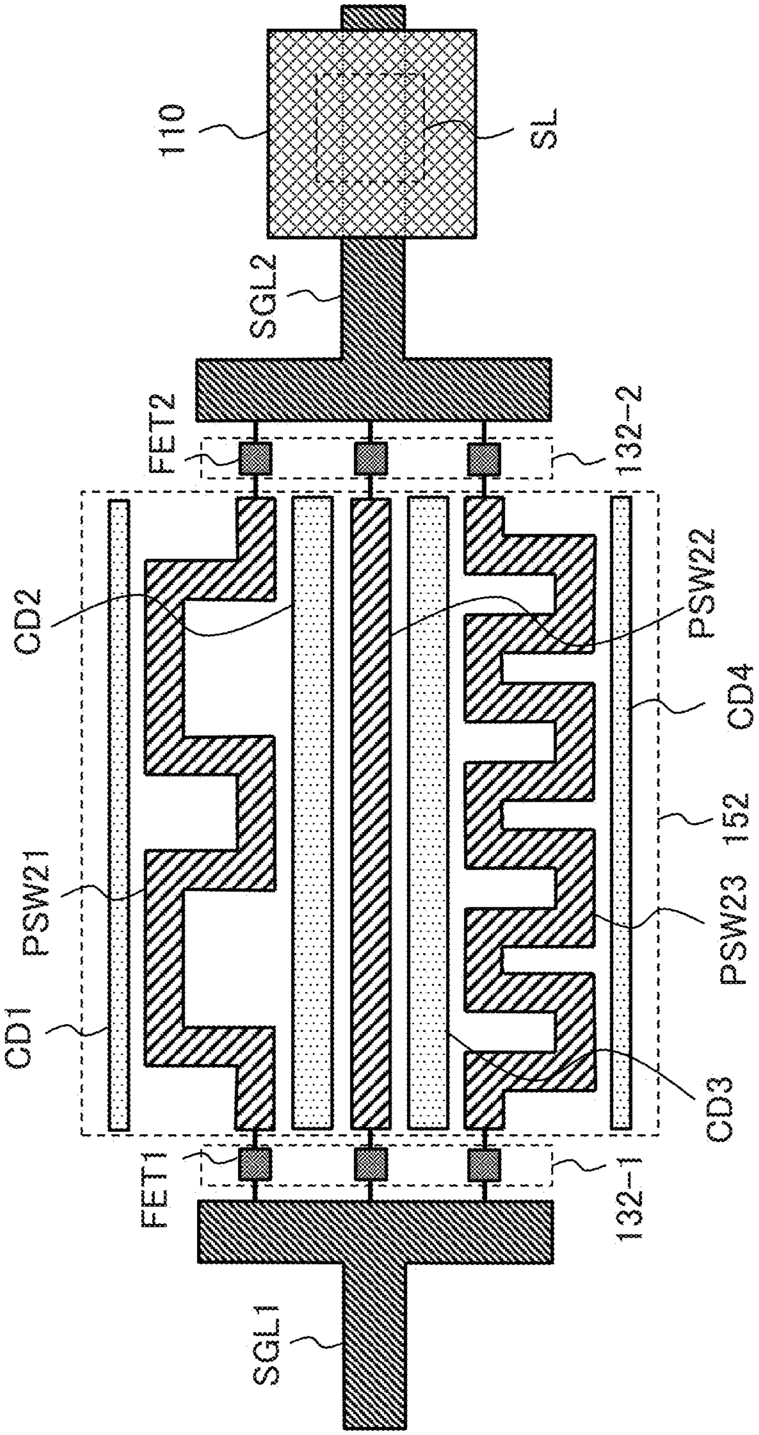
FIG. 6 is a conceptual diagram for explaining a second example of a phase shift element included in the planar antenna device according to the first example embodiment.

FIG. 6 is a conceptual diagram for explaining a second example (phase shift element 152) of a phase shift element included in the planar antenna device 10. FIG. 6 is a view of a range including the phase shift element 152 as viewed from an upper viewpoint. In the phase shift element 152 of the second example, a conductor for electromagnetic interference countermeasure is interposed between the adjacent phase shift wires PSW. The conductor for electromagnetic interference countermeasure is disposed in parallel to a straight line connecting the signal line SGL1 and the signal line SGL2. The conductor for electromagnetic interference countermeasure can also be applied to a phase shift element described later.

The phase shift element 152 of the second example includes a plurality of phase shift wires (PSW21, PSW22, PSW23) having different line lengths. The line length of the phase shift wire PSW21 is longer than that of the phase shift wire PSW22. The line length of the phase shift wire PSW23 is longer than that of the phase shift wire PSW21. The lengths of the phase shift wire PSW21, the phase shift wire PSW22, and the phase shift wire PSW23 are set in accordance with the wavelength of the transmission target radio wave.

The first end (left side) of the phase shift wire PSW21 is connected to the FET1 in the upper stage included in the switch group 132-1. The first end (left side) of the phase shift wire PSW22 is connected to the FET1 in the middle stage included in the switch group 132-1. The first end (left side) of the phase shift wire PSW23 is connected to the FET1 in the lower stage included in the switch group 132-1. The FET1 included in the switch group 132-1 is connected to one end (right side) of the signal line SGL1. The second end (right side) of each of the phase shift wire PSW21, the phase shift wire PSW22, and the phase shift wire PSW23 is connected to any of the FETs 2 included in the switch group 132-2. The FET2 included in the switch group 132-2 is connected to one end (left side) of the signal line SGL2. The other end (right side) of the signal line SGL2 extends beyond the lower side of the slot SL opened in association with the patch antenna 110.

The conductor CD1 is disposed along the longitudinal direction of the phase shift wire PSW21. The conductor CD2 is disposed between the phase shift wire PSW21 and the phase shift wire PSW22 along the longitudinal direction of the phase shift wire PSW21 and the longitudinal direction of the phase shift wire PSW22. The conductor CD2 prevents electromagnetic interference between the phase shift wire PSW21 and the phase shift wire PSW22. The conductor CD3 is disposed between the phase shift wire PSW22 and the phase shift wire PSW23 along the longitudinal direction of the phase shift wire PSW22 and the longitudinal direction of the phase shift wire PSW23. The conductor CD3 prevents electromagnetic interference between the phase shift wire PSW22 and the phase shift wire PSW23. The conductor CD4 is disposed along the longitudinal direction of the phase shift wire PSW23. The conductor CD1 and the conductor CD4 can be omitted as long as electromagnetic interference among the plurality of phase shift wires PSW can be prevented.

The phase shift amount of the phase shift wire PSW connected to the FET1 and the FET2 in the ON state according to the control signal from the signal source 19 is set as the phase shift amount of the phase shift element 151. A signal reaching the signal line SGL2 below the slot SL via the phase shift wire PSW connected to the FET1 and the FET2 in the ON state is transmitted as a radio wave by inductive resonance between the patch antenna 110 and the signal line SGL2.

In the case of the configuration of the first example (FIG. 5), in order to prevent electromagnetic interference among the plurality of phase shift wires PSW, a certain interval is provided between the adjacent phase shift wires PSW. Therefore, in the case of the configuration of the first example (FIG. 5), there is a restriction on miniaturization in order to prevent electromagnetic interference. In the case of the configuration of the second example (FIG. 6), the interval between the adjacent phase shift wires PSW can be reduced by interposing the conductor CD for interference countermeasure between the adjacent phase shift wires PSW. Therefore, the phase shift element 152 of the second example (FIG. 6) can be miniaturized in the up-down direction in the plane of drawing of FIG. 6 as compared with the phase shift element 151 of the first example (FIG. 5).

Third Example

Figure 7:
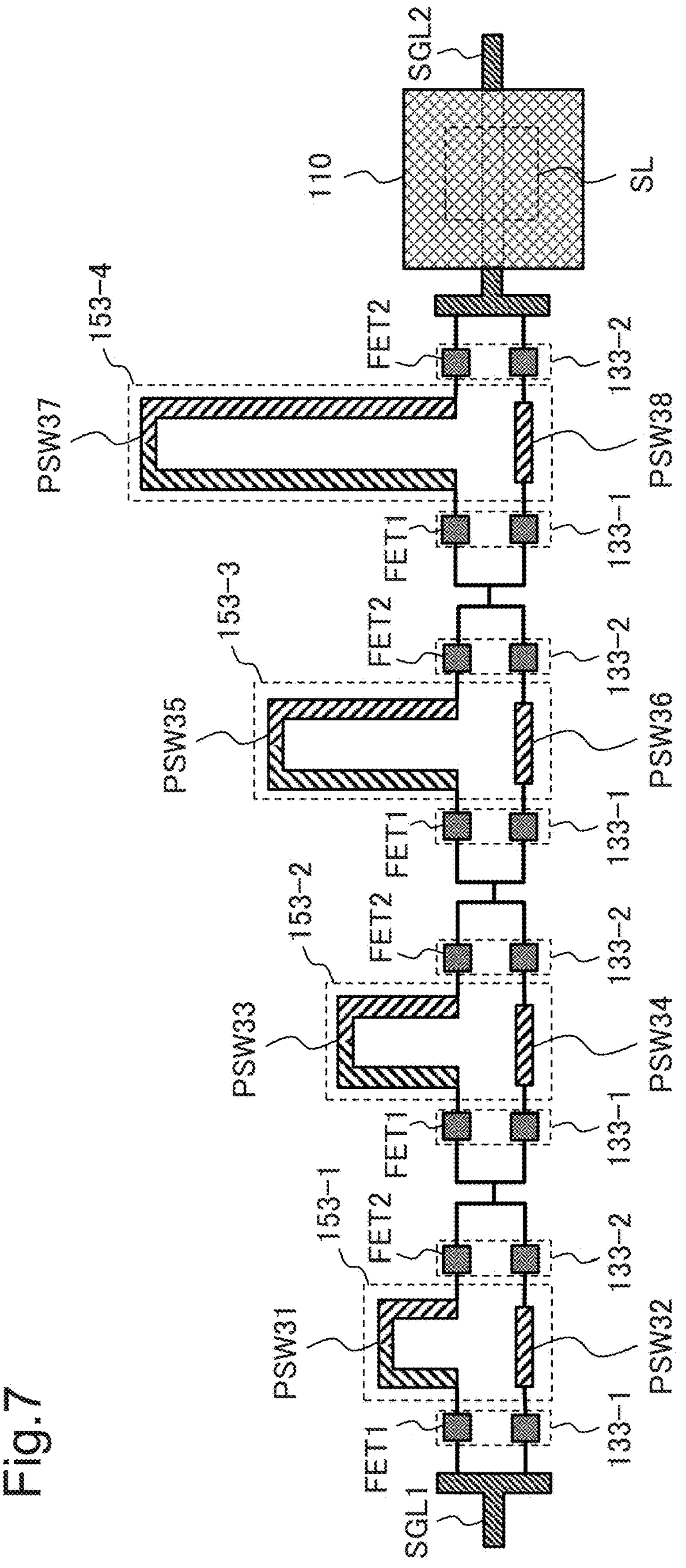
FIG. 7 is a conceptual diagram for explaining a third example of a phase shift element included in the planar antenna device according to the first example embodiment.

FIG. 7 is a conceptual diagram for explaining a third example (phase shift element 153) of a phase shift element included in the planar antenna device 10. FIG. 7 is a view of a range including the phase shift element 153 as viewed from an upper viewpoint. The phase shift element 153 is a 4-bit phase shift element in which four phase shift elements 153-1 to 153-4 are connected in series. The phase shift element 153 of the third example can set the phase shift amount by selecting a combination of a plurality of phase shift wires PSW having different phase shift amounts.

The phase shift element 153 of the third example includes four phase shift elements 153-1 to 153-4. The four phase shift elements 153-1 to 153-4 are connected in series.

The phase shift element 153-1 includes phase shift wire PSW31 and phase shift wire PSW32. The phase shift wire PSW31 has a U-shape, and has a line length longer than that of the linear phase shift wire PSW32. For example, the phase shift amount of the phase shift element 153-1 is set to 22.5 degrees.

The first end (left side) of the phase shift wire PSW31 is connected to the FET1 in the upper stage included in the switch group 133-1 connected to the phase shift element 153-1. The first end (left side) of the phase shift wire PSW32 is connected to the FET1 in the lower stage included in the switch group 133-1 connected to the phase shift element 153-1. The FET1 included in the switch group 133-1 connected to the phase shift element 153-1 is connected to one end (right side) of the signal line SGL1. The second end (right side) of the phase shift wire PSW31 is connected to the FET2 in the upper stage included in the switch group 133-2 connected to the phase shift element 153-1. The second end (right side) of the phase shift wire PSW32 is connected to the FET2 in the lower stage included in the switch group 133-2 connected to the phase shift element 153-1. The FET2 included in the switch group 133-2 connected to the phase shift element 153-1 is connected to the FET1 included in the switch group 133-1 connected to the phase shift element 153-2.

The phase shift element 153-2 includes phase shift wire PSW33 and phase shift wire PSW34. The phase shift wire PSW33 has a U-shape, and has a line length longer than that of the linear phase shift wire PSW34. The line length of the phase shift wire PSW33 of the phase shift element 153-2 is longer than that of the phase shift wire PSW31 of the phase shift element 153-1. The line length of the phase shift wire PSW34 of the phase shift element 153-2 is the same as the line length of the phase shift wire PSW32 of the phase shift element 153-1. For example, the phase shift amount of the phase shift element 153-2 is set to 45 degrees.

The first end (left side) of the phase shift wire PSW33 is connected to the FET1 in the upper stage included in the switch group 133-1 connected to the phase shift element 153-2. The first end (left side) of the phase shift wire PSW34 is connected to the FET1 in the lower stage included in the switch group 133-1 connected to the phase shift element 153-2. The FET1 included in the switch group 133-1 connected to the phase shift element 153-2 is connected to the FET2 included in the switch group 133-2 connected to the phase shift element 153-1. The second end (right side) of the phase shift wire PSW33 is connected to the FET2 in the upper stage included in the switch group 133-2 connected to the phase shift element 153-2. The second end (right side) of the phase shift wire PSW34 is connected to the FET2 in the lower stage included in the switch group 133-2 connected to the phase shift element 153-2. The FET2 included in the switch group 133-2 connected to the phase shift element 153-2 is connected to the FET1 included in the switch group 133-1 connected to the phase shift element 153-3.

The phase shift element 153-3 includes phase shift wire PSW35 and phase shift wire PSW36. The phase shift wire PSW35 has a U-shape, and has a line length longer than that of the linear phase shift wire PSW36. The line length of the phase shift wire PSW35 of the phase shift element 153-3 is longer than that of the phase shift wire PSW33 of the phase shift element 153-2. The line length of the phase shift wire PSW36 of the phase shift element 153-3 is the same as the line length of the phase shift wire PSW34 of the phase shift element 153-2. For example, the phase shift amount of the phase shift element 153-3 is set to 90 degrees.

The first end (left side) of the phase shift wire PSW35 is connected to the FET1 in the upper stage included in the switch group 133-1 connected to the phase shift element 153-3. The first end (left side) of the phase shift wire PSW36 is connected to the FET1 in the lower stage included in the switch group 133-1 connected to the phase shift element 153-3. The FET1 included in the switch group 133-1 connected to the phase shift element 153-3 is connected to the FET2 included in the switch group 133-2 connected to the phase shift element 153-2. The second end (right side) of the phase shift wire PSW35 is connected to the FET2 in the upper stage included in the switch group 133-2 connected to the phase shift element 153-3. The second end (right side) of the phase shift wire PSW36 is connected to the FET2 in the lower stage included in the switch group 133-2 connected to the phase shift element 153-3. The FET2 included in the switch group 133-2 connected to the phase shift element 153-3 is connected to the FET1 included in the switch group 133-1 connected to the phase shift element 153-4.

The phase shift element 153-4 includes phase shift wire PSW37 and phase shift wire PSW38. The phase shift wire PSW37 has a U-shape, and has a line length longer than that of the linear phase shift wire PSW38. The line length of the phase shift wire PSW37 of the phase shift element 153-4 is longer than that of the phase shift wire PSW35 of the phase shift element 153-3. The line length of the phase shift wire PSW38 of the phase shift element 153-4 is the same as the line length of the phase shift wire PSW36 of the phase shift element 153-3. For example, the phase shift amount of the phase shift element 153-4 is set to 180 degrees.

The first end (left side) of the phase shift wire PSW37 is connected to the FET1 in the upper stage included in the switch group 133-1 connected to the phase shift element 153-4. The first end (left side) of the phase shift wire PSW38 is connected to the FET1 in the lower stage included in the switch group 133-1 connected to the phase shift element 153-4. The FET1 included in the switch group 133-1 connected to the phase shift element 153-4 is connected to the FET2 included in the switch group 133-2 connected to the phase shift element 153-3. The second end (right side) of the phase shift wire PSW37 is connected to the FET2 in the upper stage included in the switch group 133-2 connected to the phase shift element 153-4. The second end (right side) of the phase shift wire PSW38 is connected to the FET2 in the lower stage included in the switch group 133-2 connected to the phase shift element 153-4. The FET2 included in the switch group 133-2 connected to the phase shift element 153-4 is connected to the FET1 included in the switch group 133-1 connected to the phase shift element 153-4. The FET2 included in the switch group 131-2 connected to the phase shift element 153-4 is connected to one end (left side) of the signal line SGL2. The other end (right side) of the signal line SGL2 extends beyond the lower side of the slot SL opened in association with the patch antenna 110.

That is, the line length becomes longer in the order of the phase shift wire PSW31, the phase shift wire PSW33, the phase shift wire PSW35, and the phase shift wire PSW37. Furthermore, the line lengths of the phase shift wire PSW32, the phase shift wire PSW34, the phase shift wire PSW36, and the phase shift wire PSW38 are the same. The lengths of the phase shift wires PSW31 to 38 are set in accordance with the wavelength of the transmission target radio wave.

The phase shift amount of the phase shift wire PSW connected to the FET1 and the FET2 set to the ON state according to the control signal from the signal source 19 is set as the phase shift amount for each phase shift element 153-1 to 153-4. The total value of the phase shift amounts for each phase shift element 153-1 to 153-4 corresponds to the entire phase shift amount of the phase shift element 153. A signal reaching the signal line SGL2 below the slot SL via the phase shift wire PSW connected to the FET1 and the FET2 in the ON state is transmitted as a radio wave by inductive resonance between the patch antenna 110 and the signal line SGL2. In the case of the structure of FIG. 7, since a response delay in the dielectric layer 113 does not occur, the phase can be switched at high speed. Furthermore, in the case of the structure of FIG. 7, the phase shift amount of the phase shift element 153 can be set to an appropriate value by selecting the phase shift wire PSW according to the situation.

Fourth Example

Figure 8:
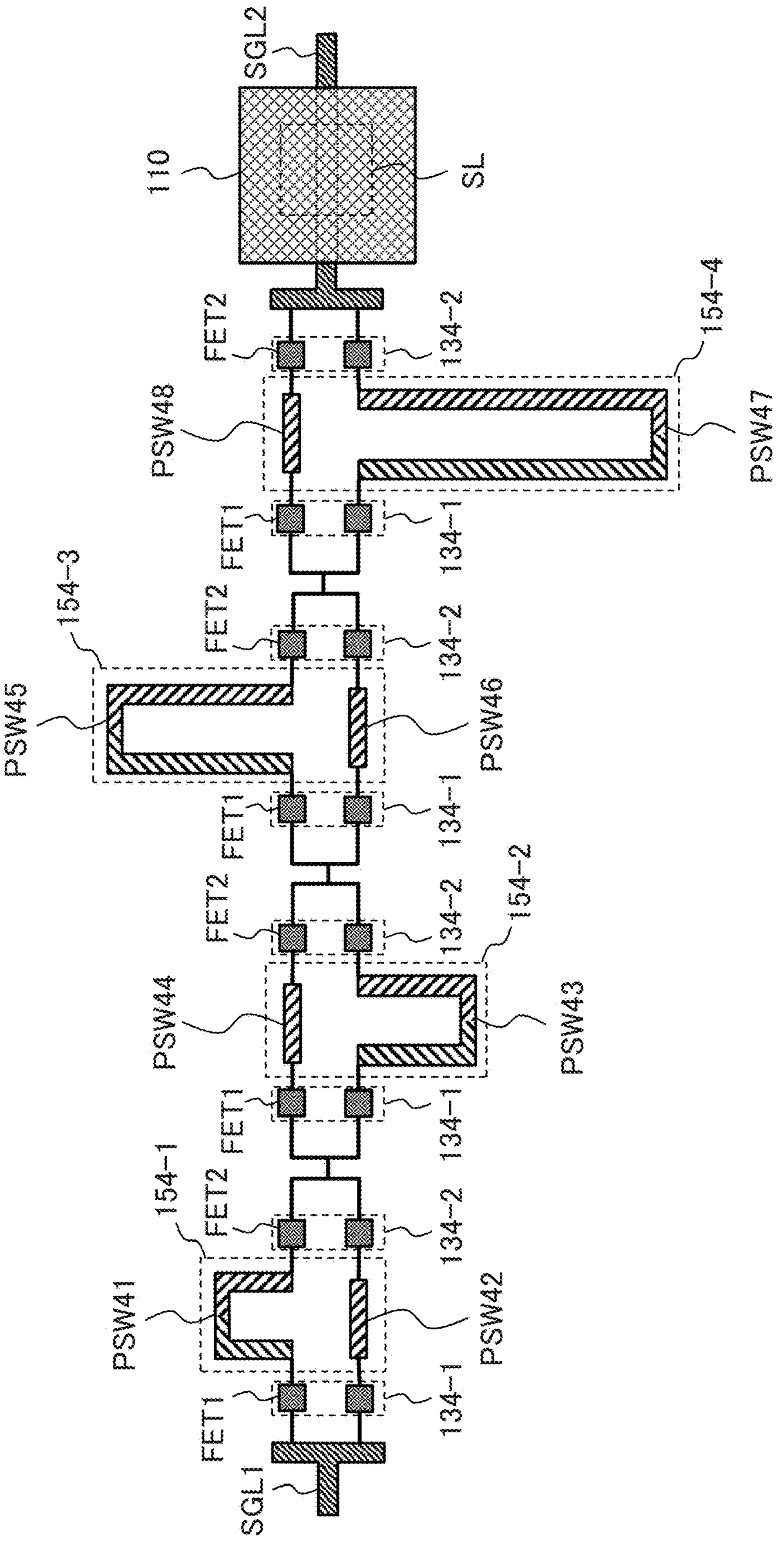
FIG. 8 is a conceptual diagram for explaining a fourth example of a phase shift element included in the planar antenna device according to the first example embodiment.

FIG. 8 is a conceptual diagram for explaining a fourth example (phase shift element 154) of a phase shift element included in the planar antenna device 10. FIG. 8 is a view of a range including the phase shift element 154 as viewed from an upper viewpoint. The phase shift element 154 includes four phase shift elements 154-1 to 154-4. The phase shift element 154 is a 4-bit phase shift element in which four phase shift elements 154-1 to 154-4 are connected in series. The phase shift element 154 of the fourth example can set the phase shift amount by selecting a combination of a plurality of phase shift wires PSW having different phase shift amounts. The phase shift element 154 of the fourth example has a configuration in which the arrangement of the phase shift wire PSW included in the phase shift element 153 of the third example is changed.

The phase shift element 154-1 includes phase shift wire PSW41 and phase shift wire PSW42. The phase shift wire PSW41 has a U-shape, and has a line length longer than that of the linear phase shift wire PSW42. For example, the phase shift amount of the phase shift element 154-1 is set to 22.5 degrees.

The first end (left side) of the phase shift wire PSW41 is connected to the FET1 in the upper stage included in the switch group 134-1 connected to the phase shift element 154-1. The first end (left side) of the phase shift wire PSW42 is connected to the FET1 in the lower stage included in the switch group 134-1 connected to the phase shift element 154-1. The FET1 included in the switch group 134-1 connected to the phase shift element 154-1 is connected to one end (right side) of the signal line SGL1. The second end (right side) of the phase shift wire PSW41 is connected to the FET2 in the upper stage included in the switch group 134-2 connected to the phase shift element 154-1. The second end (right side) of the phase shift wire PSW42 is connected to the FET2 in the lower stage included in the switch group 134-2 connected to the phase shift element 154-1. The FET2 included in the switch group 134-2 connected to the phase shift element 154-1 is connected to the FET1 included in the switch group 134-1 connected to the phase shift element 154-2.

The phase shift element 154-2 includes phase shift wire PSW43 and phase shift wire PSW44. The phase shift wire PSW43 has a U-shape, and has a line length longer than that of the linear phase shift wire PSW44. The line length of the phase shift wire PSW43 of the phase shift element 154-2 is longer than that of the phase shift wire PSW41 of the phase shift element 154-1. The line length of the phase shift wire PSW44 of the phase shift element 154-2 is the same as the line length of the phase shift wire PSW42 of the phase shift element 154-1. For example, the phase shift amount of the phase shift element 154-2 is set to 45 degrees.

The first end (left side) of the phase shift wire PSW43 is connected to the FET1 in the lower stage included in the switch group 134-1 connected to the phase shift element 154-2. The first end (left side) of the phase shift wire PSW44 is connected to the FET1 in the upper stage included in the switch group 134-1 connected to the phase shift element 154-2. The FET1 included in the switch group 134-1 connected to the phase shift element 154-2 is connected to the FET2 included in the switch group 134-2 connected to the phase shift element 154-1. The second end (right side) of the phase shift wire PSW43 is connected to the FET2 in the lower stage included in the switch group 134-2 connected to the phase shift element 154-2. The second end (right side) of the phase shift wire PSW44 is connected to the FET2 in the upper stage included in the switch group 134-2 connected to the phase shift element 154-2. The FET2 included in the switch group 134-2 connected to the phase shift element 154-2 is connected to the FET1 included in the switch group 134-1 connected to the phase shift element 154-3.

The phase shift element 154-3 includes phase shift wire PSW45 and phase shift wire PSW46. The phase shift wire PSW45 has a U-shape, and has a line length longer than that of the linear phase shift wire PSW46. The line length of the phase shift wire PSW45 of the phase shift element 154-3 is longer than that of the phase shift wire PSW43 of the phase shift element 154-2. The line length of the phase shift wire PSW46 of the phase shift element 154-3 is the same as the line length of the phase shift wire PSW44 of the phase shift element 154-2. For example, the phase shift amount of the phase shift element 154-3 is set to 90 degrees.

The first end (left side) of the phase shift wire PSW45 is connected to the FET1 in the upper stage included in the switch group 134-1 connected to the phase shift element 154-3. The first end (left side) of the phase shift wire PSW46 is connected to the FET1 in the lower stage included in the switch group 134-1 connected to the phase shift element 154-3. The FET1 included in the switch group 134-1 connected to the phase shift element 154-3 is connected to the FET2 included in the switch group 134-2 connected to the phase shift element 154-2. The second end (right side) of the phase shift wire PSW45 is connected to the FET2 in the upper stage included in the switch group 134-2 connected to the phase shift element 154-3. The second end (right side) of the phase shift wire PSW46 is connected to the FET2 in the lower stage included in the switch group 134-2 connected to the phase shift element 154-3. The FET2 included in the switch group 134-2 connected to the phase shift element 154-3 is connected to the FET1 included in the switch group 134-1 connected to the phase shift element 154-4.

The phase shift element 154-4 includes phase shift wire PSW47 and phase shift wire PSW48. The phase shift wire PSW47 has a U-shape, and has a line length longer than that of the linear phase shift wire PSW48. The line length of the phase shift wire PSW47 of the phase shift element 154-4 is longer than that of the phase shift wire PSW45 of the phase shift element 154-3. The line length of the phase shift wire PSW48 of the phase shift element 154-4 is the same as the line length of the phase shift wire PSW46 of the phase shift element 154-3. For example, the phase shift amount of the phase shift element 154-4 is set to 180 degrees.

The first end (left side) of the phase shift wire PSW47 is connected to the FET1 in the lower stage included in the switch group 134-1 connected to the phase shift element 154-4. The first end (left side) of the phase shift wire PSW48 is connected to the FET1 in the upper stage included in the switch group 134-1 connected to the phase shift element 154-4. The FET1 included in the switch group 134-1 connected to the phase shift element 154-4 is connected to the FET2 included in the switch group 134-2 connected to the phase shift element 154-3. The second end (right side) of the phase shift wire PSW47 is connected to the FET2 in the lower stage included in the switch group 134-2 connected to the phase shift element 154-4. The second end (right side) of the phase shift wire PSW48 is connected to the FET2 in the upper stage included in the switch group 134-2 connected to the phase shift element 154-4. The FET2 included in the switch group 134-2 connected to the phase shift element 154-4 is connected to the FET1 included in the switch group 134-1 connected to the phase shift element 154-4. The FET2 included in the switch group 131-2 connected to the phase shift element 154-4 is connected to one end (left side) of the signal line SGL2. The other end (right side) of the signal line SGL2 extends beyond the lower side of the slot SL opened in association with the patch antenna 110.

That is, the line length becomes longer in the order of the phase shift wire PSW41, the phase shift wire PSW43, the phase shift wire PSW45, and the phase shift wire PSW47. Furthermore, the line lengths of the phase shift wire PSW42, the phase shift wire PSW44, the phase shift wire PSW46, and the phase shift wire PSW48 are the same. The lengths of the phase shift wires PSW41 to 38 are set in accordance with the wavelength of the transmission target radio wave.

The phase shift amount of the phase shift wire PSW connected to the FET1 and the FET2 set to the ON state according to the control signal from the signal source 19 is set as the phase shift amount for each phase shift element 154-1 to 154-4. The total value of the phase shift amounts for each phase shift element 154-1 to 154-4 corresponds to the entire phase shift amount of the phase shift element 154. A signal reaching the signal line SGL2 below the slot SL via the phase shift wire PSW connected to the FET1 and the FET2 in the ON state is transmitted as a radio wave by inductive resonance between the patch antenna 110 and the signal line SGL2. In the case of the structure of FIG. 8, since a response delay in the dielectric layer 113 does not occur, the phase can be switched at high speed.

Furthermore, in the case of the structure of FIG. 8, the phase shift amount of the phase shift element 154 can be set to an appropriate value by selecting the phase shift wire PSW according to the situation. In addition, in the case of the structure of FIG. 8, out of the pairs of phase shift wires PSW included in each of the phase shift elements 154-1 to 154-4, phase shift wires PSW having a long line length are distributed above and below. Therefore, the distance of the phase shift wire PSW having the longer line length included in the phase shift elements 154-1 to 154-4 adjacent to each other in the fourth example (FIG. 8) is larger than that in the third example (FIG. 7). As a result, electromagnetic interference is reduced in the fourth example (FIG. 8) as compared with the third example (FIG. 7).

Figure 9:
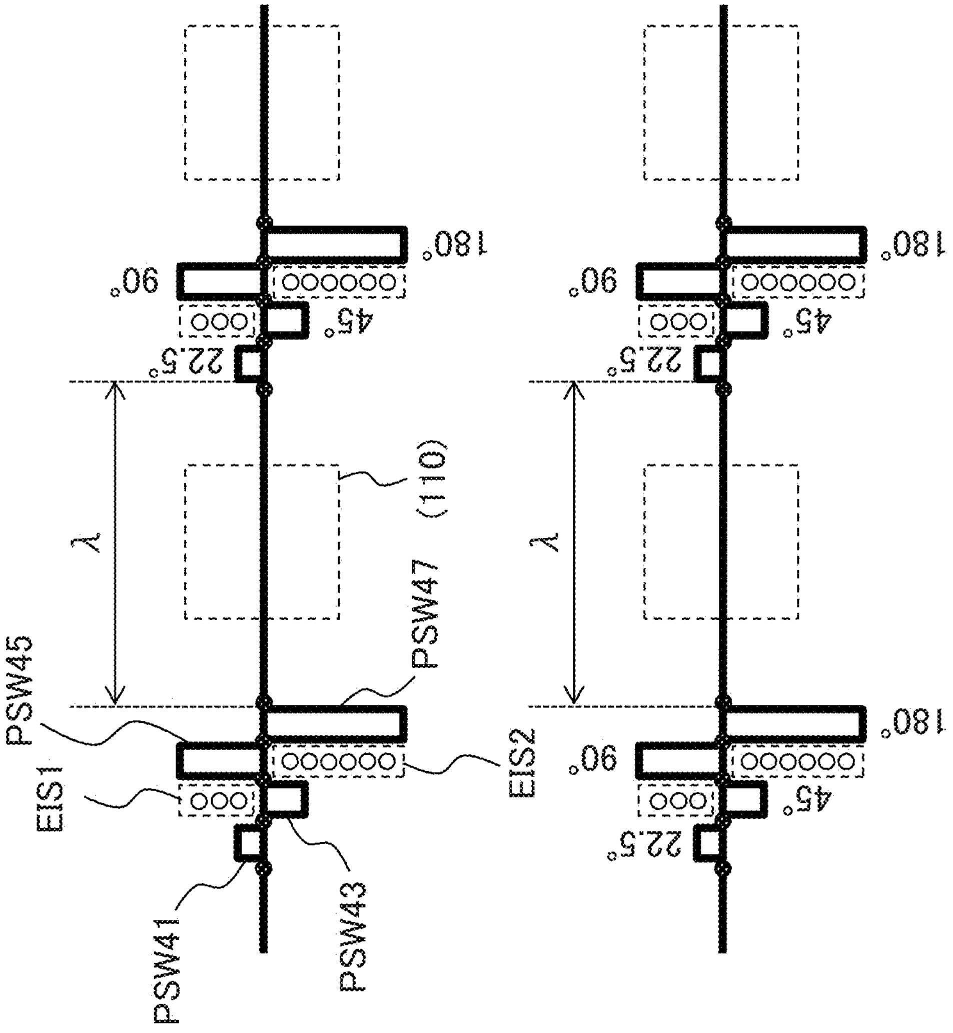
FIG. 9 is a conceptual diagram illustrating an example in which phase shift elements of the fourth example included in the planar antenna device according to the first example embodiment are arranged in association with the patch antennas arrayed in an array.

FIG. 9 is a conceptual diagram illustrating an example in which the phase shift elements 154 of the fourth example are arranged in association with the patch antennas 110 arranged in an array. In FIG. 9, a position associated to the patch antenna 110 is indicated by a square of a broken line. FIG. 9 illustrates an example in which the phase shift elements 154 are arrayed in association with the patch antennas 110 arranged in an array of 2 rows and 2 columns. The phase shift elements 154 adjacent to each other are arranged at intervals of the wavelength k of the transmission target radio wave with the lower region of the patch antenna 110 interposed therebetween. In FIG. 9, portions of the FET1 and the FET2 included in the switch group 134 are indicated by dots.

The phase shift wire PSW41 shifts the phase of the signal by 22.5° (degrees). The phase shift wire PSW43 shifts the phase of the signal by 45° (degrees). The phase shift wire PSW45 shifts the phase of the signal by 90° (degrees). The phase shift wire PSW47 shifts the phase of the signal by 180° (degrees). In FIG. 9, the phase shift wire PSW42, the phase shift wire PSW44, the phase shift wire PSW46, and the phase shift wire PSW48 are omitted.

An electromagnetic interference reduction structure EIS1 is formed between the phase shift wire PSW41 and the phase shift wire PSW45. The electromagnetic interference reduction structure EIS1 is configured by a plurality of vias. The plurality of vias included in the electromagnetic interference reduction structure EIS1 are formed along the phase shift wire PSW45 having a longer line length. The electromagnetic interference reduction structure EIS1 suppresses electromagnetic interference between the phase shift wire PSW41 and the phase shift wire PSW45.

An electromagnetic interference reduction structure EIS2 is formed between the phase shift wire PSW43 and the phase shift wire PSW47. The electromagnetic interference reduction structure EIS2 is configured by a plurality of vias. The plurality of vias included in the electromagnetic interference reduction structure EIS2 are formed along the phase shift wire PSW47 having a longer line length. The electromagnetic interference reduction structure EIS2 suppresses electromagnetic interference between the phase shift wire PSW43 and the phase shift wire PSW47.

The plurality of vias included in the electromagnetic interference reduction structure EIS1 and the electromagnetic interference reduction structure EIS2 penetrate from the formation layer of the phase shift wire PSW to the ground layer GL. A conductive portion is formed inside the via and at the periphery of the opening. For example, conductive plating is applied to the conductive portion of the via. The conductive portion of the via electrically connects the formation layer of the phase shift wire PSW and the ground layer GL.

In the configuration of FIG. 9, since the electromagnetic interference reduction structure EIS is formed between the phase shift wires PSW in the same direction with the signal line interposed therebetween, the interval between the phase shift wires PSW can be reduced. Therefore, as compared with the case where the electromagnetic interference reduction structure EIS is not provided, the area of the phase shifter 15 configured by the plurality of phase shift elements 154 can be reduced in the case where the electromagnetic interference reduction structure EIS is provided.

Fifth Example

Figure 10:
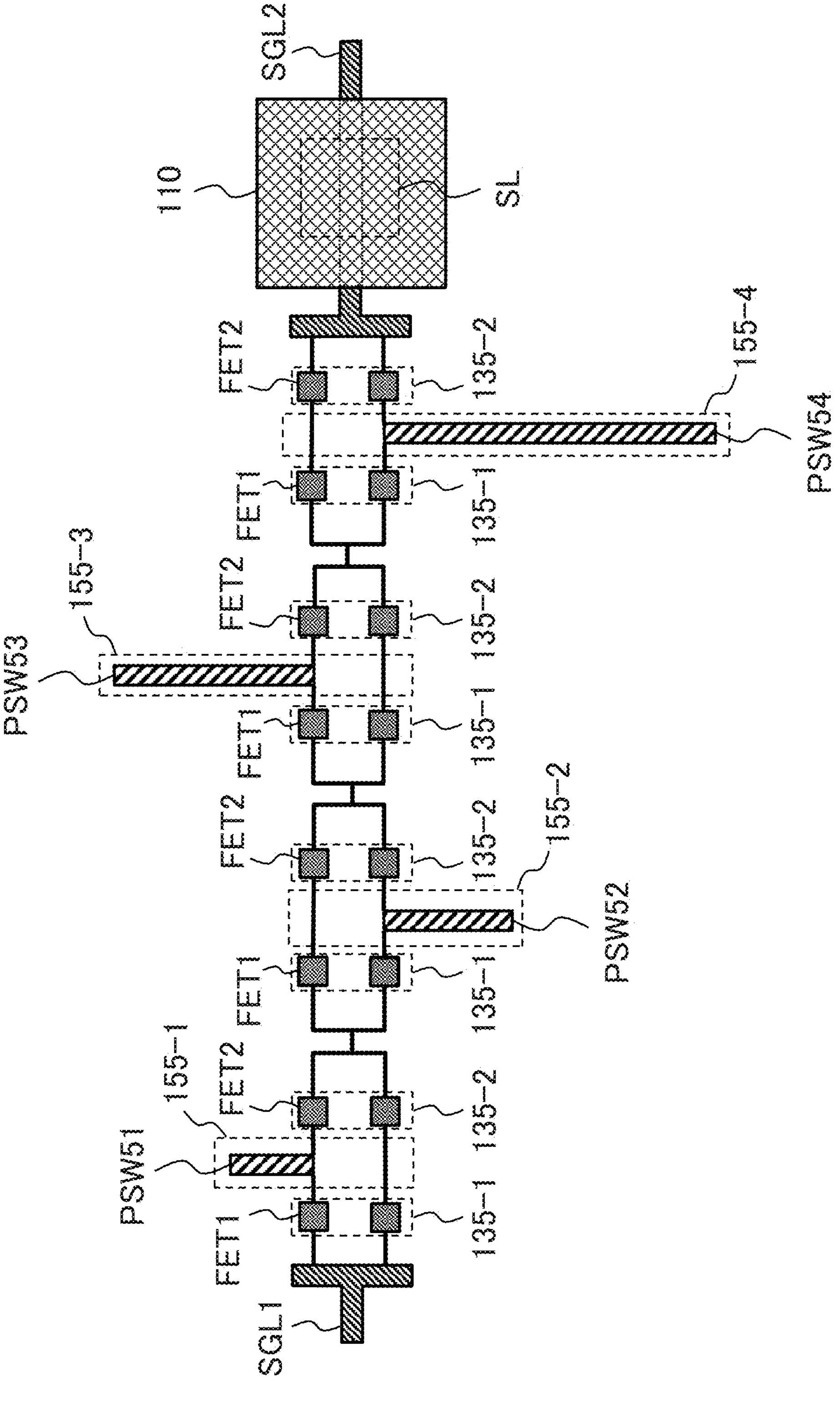
FIG. 10 is a conceptual diagram for explaining a fifth example of a phase shift element included in the planar antenna device according to the first example embodiment.

FIG. 10 is a conceptual diagram for explaining a fifth example (phase shift element 155) of a phase shift element included in the planar antenna device 10. FIG. 10 is a view of a range including the phase shift element 155 as viewed from an upper viewpoint. The phase shift element 155 includes four phase shift elements 155-1 to 155-4. The phase shift element 155 is a 4-bit phase shift element in which four phase shift elements 155-1 to 155-4 are connected in series. The phase shift element 155 of the fifth example can set the phase shift amount by selecting a combination of a plurality of phase shift wires PSW having different phase shift amounts. The four phase shift elements 155-1 to 155-4 include reflective phase shift wire. The phase shift element 155 of the fifth example has a configuration in which the phase shift wire included in the phase shift element 154 of the fourth example is changed to a reflective phase shift wire.

The phase shift element 155-1 includes a phase shift wire PSW51. The phase shift wire PSW51 has an I-shape and is a reflective phase shift wire. The phase shift element 155-1 includes a signal line (lower stage) in which the phase shift wire PSW is not disposed. A phase shift wire PSW may also be disposed in a portion of the signal line (lower stage) of the phase shift element 155-1. For example, the phase shift amount of the phase shift element 155-1 is set to 22.5 degrees.

The first end (lower side) of the phase shift wire PSW51 is connected to the FET1 in the upper stage included in the switch group 135-1 connected to the phase shift element 155-1 and the FET2 in the upper stage included in the switch group 135-2 connected to the phase shift element 155-1. The second end (upper side) of the phase shift wire PSW51 is an open end. The signal line (lower stage) connects the FET1 in the lower stage included in the switch group 135-1 connected to the phase shift element 155-1 and the FET2 in the lower stage included in the switch group 135-2 connected to the phase shift element 155-1. The FET1 included in the switch group 135-1 connected to the phase shift element 155-1 is connected to one end (right side) of the signal line SGL1. The FET2 included in the switch group 135-2 connected to the phase shift element 155-1 is connected to the FET1 included in the switch group 135-1 connected to the phase shift element 155-2.

The phase shift element 155-2 includes a phase shift wire PSW52. The phase shift wire PSW52 has an I-shape and is a reflective phase shift wire. The phase shift element 155-2 includes a signal line (upper stage) in which the phase shift wire PSW is not disposed. A phase shift wire PSW may also be disposed in a portion of the signal line (upper stage) of the phase shift element 155-2. The line length of the phase shift wire PSW52 of the phase shift element 155-2 is longer than that of the phase shift wire PSW51 of the phase shift element 155-1. For example, the phase shift amount of the phase shift element 155-2 is set to 45 degrees.

The first end (upper side) of the phase shift wire PSW52 is connected to the FET1 in the lower stage included in the switch group 135-1 connected to the phase shift element 155-2 and the FET2 in the lower stage included in the switch group 135-2 connected to the phase shift element 155-2. The second end (lower side) of the phase shift wire PSW52 is an open end. The signal line (upper stage) connects the FET1 in the upper stage included in the switch group 135-1 connected to the phase shift element 155-2 and the FET2 in the upper stage included in the switch group 135-2 connected to the phase shift element 155-2. The FET1 included in the switch group 135-1 connected to the phase shift element 155-2 is connected to the FET2 included in the switch group 135-2 connected to the phase shift element 155-1. The FET2 included in the switch group 135-2 connected to the phase shift element 155-2 is connected to the FET1 included in the switch group 135-1 connected to the phase shift element 155-3.

The phase shift element 155-3 includes a phase shift wire PSW53. The phase shift wire PSW53 has an I-shape and is a reflective phase shift wire. The phase shift element 155-3 includes a signal line (lower stage) in which the phase shift wire PSW is not disposed. A phase shift wire PSW may also be disposed in a portion of the signal line (lower stage) of the phase shift element 155-3. The line length of the phase shift wire PSW53 of the phase shift element 155-3 is longer than that of the phase shift wire PSW52 of the phase shift element 155-2. For example, the phase shift amount of phase shift element 155-3 is set to 90 degrees.

The first end (lower side) of the phase shift wire PSW53 is connected to the FET1 in the upper stage included in the switch group 135-1 connected to the phase shift element 155-3 and the FET2 in the lower stage included in the switch group 135-2 connected to the phase shift element 155-3. The second end (upper side) of the phase shift wire PSW53 is an open end. The signal line (lower stage) connects the FET1 in the lower stage included in the switch group 135-1 connected to the phase shift element 155-3 and the FET2 in the lower stage included in the switch group 135-2 connected to the phase shift element 155-3. The FET1 included in the switch group 135-1 connected to the phase shift element 155-3 is connected to the FET2 included in the switch group 135-2 connected to the phase shift element 155-2. The FET2 included in the switch group 135-2 connected to the phase shift element 155-3 is connected to the FET1 included in the switch group 135-1 connected to the phase shift element 155-4.

The phase shift element 155-4 includes a phase shift wire PSW54. The phase shift wire PSW54 has an I-shape and is a reflective phase shift wire. The phase shift element 155-4 includes a signal line (upper stage) in which the phase shift wire PSW is not disposed. A phase shift wire PSW may also be disposed in a portion of the signal line (upper stage) of the phase shift element 155-4. The line length of the phase shift wire PSW54 of the phase shift element 155-4 is longer than that of the phase shift wire PSW53 of the phase shift element 155-3. For example, the phase shift amount of phase shift element 155-4 is set to 180 degrees.

The first end (upper side) of the phase shift wire PSW54 is connected to the FET1 in the upper stage included in the switch group 135-1 connected to the phase shift element 155-4 and the FET2 in the upper stage included in the switch group 135-2 connected to the phase shift element 155-4. The second end (lower side) of the phase shift wire PSW54 is an open end. The signal line (upper stage) connects the FET1 in the lower stage included in the switch group 135-1 connected to the phase shift element 155-4 and the FET2 in the lower stage included in the switch group 135-2 connected to the phase shift element 155-4. The FET1 included in the switch group 135-1 connected to the phase shift element 155-4 is connected to the FET2 included in the switch group 135-2 connected to the phase shift element 155-3. The FET2 included in the switch group 135-2 connected to the phase shift element 155-4 is connected to one end (left side) of the signal line SGL2. The other end (right side) of the signal line SGL2 extends beyond the lower side of the slot SL opened in association with the patch antenna 110.

That is, the line length becomes longer in the order of the phase shift wire PSW51, the phase shift wire PSW52, the phase shift wire PSW53, and the phase shift wire PSW54. The lengths of the phase shift wires PSW51 to 54 are set in accordance with the wavelength of the transmission target radio wave.

The phase shift amount of the phase shift wire PSW connected to the FET1 and the FET2 set to the ON state according to the control signal from the signal source 19 is set as the phase shift amount for each phase shift element 155-1 to 155-4. The total value of the phase shift amounts for each phase shift element 155-1 to 155-4 corresponds to the entire phase shift amount of the phase shift element 155. A signal reaching the signal line SGL2 below the slot SL via the phase shift wire PSW connected to the FET1 and the FET2 in the ON state is transmitted as a radio wave by inductive resonance between the patch antenna 110 and the signal line SGL2.

In the structure of FIG. 10, since a response delay in the dielectric layer 113 does not occur, the phase can be switched at high speed. In the structure of FIG. 10, the phase shift amount of the phase shift element 155 can be set to an appropriate value by selecting the phase shift wire PSW according to the situation. The structure of FIG. 10 includes a reflective phase shift wire PSW. Therefore, the fifth example (FIG. 10) can be configured to be smaller in the direction perpendicular to the phase shift wire PSW than the fourth example (FIG. 8).

Figure 11:
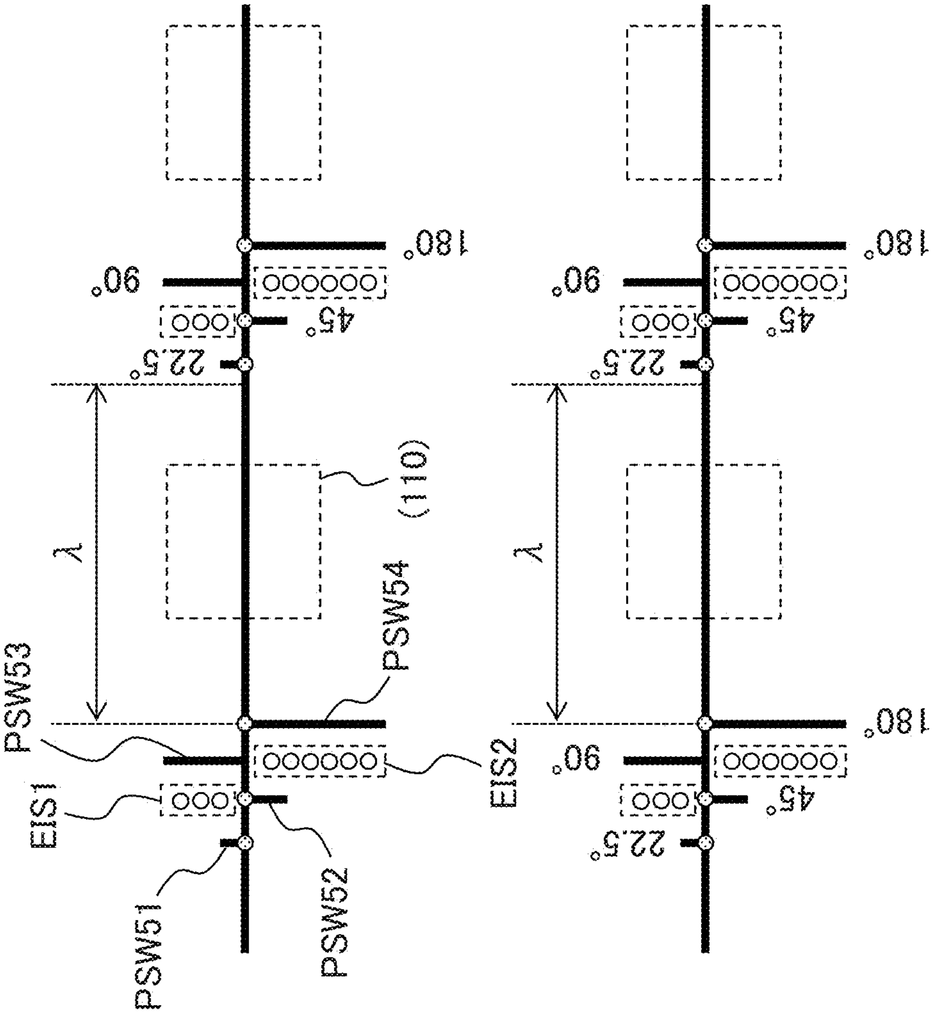
FIG. 11 is a conceptual diagram illustrating an example in which phase shift elements of the fifth example included in the planar antenna device according to the first example embodiment are arranged in association with the patch antennas arrayed in an array.

FIG. 11 is a conceptual diagram illustrating an example in which the phase shift elements 155 of the fifth example are arrayed in association with the patch antennas 110 arrayed in an array. In FIG. 11, a position associated to the patch antenna 110 is indicated by a square of a broken line. FIG. 11 illustrates an example in which the phase shift elements 155 are arrayed in association with the patch antennas 110 arranged in an array of 2 rows and 2 columns. The phase shift elements 155 adjacent to each other are arranged at intervals of the wavelength k of the transmission target radio wave with the lower region of the patch antenna 110 interposed therebetween. In FIG. 11, portions of the FET1 and the FET2 included in the switch group 135 are indicated by dots.

The phase shift wire PSW51 shifts the phase of the signal by 22.5° (degrees). The phase shift wire PSW53 shifts the phase of the signal by 45° (degrees). The phase shift wire PSW55 shifts the phase of the signal by 90° (degrees). The phase shift wire PSW57 shifts the phase of the signal by 180° (degrees).

An electromagnetic interference reduction structure EIS1 is formed between the phase shift wire PSW51 and the phase shift wire PSW53. The electromagnetic interference reduction structure EIS1 is configured by a plurality of vias. The plurality of vias included in the electromagnetic interference reduction structure EIS1 are formed along the phase shift wire PSW53 having a longer line length. The electromagnetic interference reduction structure EIS1 suppresses electromagnetic interference between the phase shift wire PSW51 and the phase shift wire PSW53.

The electromagnetic interference reduction structure EIS2 is formed between the phase shift wire PSW52 and the phase shift wire PSW54. The electromagnetic interference reduction structure EIS2 is configured by a plurality of vias. The plurality of vias included in the electromagnetic interference reduction structure EIS2 are formed along the phase shift wire PSW54 having a longer line length. The electromagnetic interference reduction structure EIS2 suppresses electromagnetic interference between the phase shift wire PSW52 and the phase shift wire PSW54.

The plurality of vias included in the electromagnetic interference reduction structure EIS1 and the electromagnetic interference reduction structure EIS2 penetrate to the ground layer GL. A conductive portion is formed inside the via and at the periphery of the opening. For example, conductive plating is applied to the conductive portion of the via. The conductive portion of the via electrically connects the formation layer of the phase shift wire PSW and the ground layer GL.

In the configuration of FIG. 11, since the electromagnetic interference reduction structure EIS is formed between the phase shift wires PSW in the same direction with the signal line interposed therebetween, the interval between the phase shift wires PSW can be reduced. Therefore, as compared with the case where the electromagnetic interference reduction structure EIS is not provided, the area of the phase shifter 15 configured by the plurality of phase shift elements 155 can be reduced in the case where the electromagnetic interference reduction structure EIS is provided.

As described above, the planar antenna device of the present example embodiment includes a first substrate, a dielectric layer, and a second substrate. The patch antenna is disposed on the upper surface of the first substrate. A ground layer in which a slot is formed in a lower region of the patch antenna is disposed on the lower surface of the first substrate. The dielectric layer is disposed such that the upper surface comes into contact with the ground layer disposed on the lower surface of the first substrate. The second substrate is disposed in contact with the lower surface of the dielectric layer. The second substrate includes a matrix circuit, a first signal line, a phase shift wire, a second signal line, and a switch group. The matrix circuit includes a transistor pair including a first thin-film transistor and a second thin-film transistor. The first signal line is formed on the upper surface of the second substrate and receives a signal to be transmitted. The phase shift element is formed on the upper surface of the second substrate and is configured by a plurality of phase shift wires. The second signal line is formed on the upper surface of the second substrate, is disposed below the slot, and is electromagnetically coupled to the patch antenna through the slot. The switch group includes a first switching element and a second switching element formed using a manufacturing process technology of a micro-LED display. In the first switching element, a first end of a channel is connected to one end of any of the plurality of phase shift wires, and a control electrode is connected to the first thin-film transistor. In the second switching element, a first end of a channel is connected to the other end of any of the plurality of phase shift wires, and a control electrode is connected to the second thin-film transistor.

The planar antenna device of the present example embodiment can dispersedly form switching elements having a high response speed with respect to a plurality of thin-film transistors configuring a matrix circuit having a large area by using a manufacturing process technology of a micro-LED display. Since the planar antenna device of the present example embodiment does not include the liquid crystal layer, a response delay in the liquid crystal layer does not occur. Therefore, the planar antenna device of the present example embodiment can switch the phase of the signal to be transmitted at a high speed as compared with a general planar antenna using liquid crystal. In addition, since the planar antenna device of the present example embodiment has a larger gain as compared with a general planar antenna, a sufficient bandwidth can be secured. That is, according to the planar antenna device of the present example embodiment, the phase of the signal to be transmitted can be switched at high speed while securing a sufficient bandwidth.

In one aspect of the present example embodiment, the phase shift element has a structure in which a plurality of phase shift wires having different line lengths are arranged in parallel. According to the present aspect, the phase shift amount of the phase shift element can be adjusted by selecting one of the plurality of phase shift wires arranged in parallel.

In one aspect of the present example embodiment, the phase shift element has a structure in which a plurality of pairs in which two phase shift wires having different line lengths are arranged in parallel are connected in series. The phase shift wire having a longer line length among the plurality of pairs has a U-shape in which one end is connected to the first end of the first switching element and the other end is connected to the first end of the second switching element. According to the present aspect, the phase shift amount of the phase shift element can be adjusted by selecting one of the phase shift wires for the plurality of pairs of phase shift wires arranged in parallel. In addition, according to the present aspect, since the phase shift wire having the U-shape is included in each phase shift element, the phase shift amount of the phase shift element can be greatly changed.

In one aspect of the present example embodiment, the phase shift element has a structure in which a plurality of pairs in which two phase shift wires having different line lengths are connected in parallel are connected in series. The phase shift wire having a longer line length of the plurality of pairs has an I-shaped shape in which one end is connected to the first end of the first switching element and the first end of the second switching element and the other end is an open end. According to the present aspect, since the reflective phase shift wire is included in each phase shift element, the size of the phase shift element can be miniaturized.

In one aspect of the present example embodiment, in the phase shift elements adjacent to each other, a phase shift wire having a longer line length is disposed at a position on a side opposite to a straight line connecting the first signal line and the second signal line. According to the present aspect, with respect to the phase shift elements adjacent to each other, the phase shift wire having the longer line length is directed in the opposite direction, so that interference between proximate phase shift wires can be reduced.

In one aspect of the present example embodiment, the electromagnetic interference reduction structure is formed between the phase shift wires adjacent to each other and having longer line length at the position on the same side with respect to the straight line connecting the first signal line and the second signal line. The electromagnetic interference reduction structure is configured by a plurality of vias electrically connecting the upper surface of the second substrate and the ground layer. According to the present aspect, since the electromagnetic interference reduction structure is formed between the phase shift wires adjacent to each other and having the longer line length, interference between proximate phase shift wires can be reduced.

In one aspect of the present example embodiment, the phase shift device included in the planar antenna device is manufactured by combining a thin-film transistor manufacturing process technology and a micro-LED display manufacturing process technology. The matrix circuit including the transistor pair configured by the first thin-film transistor and the second thin-film transistor is formed using a thin-film transistor manufacturing process technology. The phase shift element configured by the plurality of phase shift wires is formed above the matrix circuit. The first switching element and the second switching element are formed using a micro-LED display manufacturing process technology.

In the method for manufacturing the phase shift device of the present aspect, a switching element having a high response speed is formed by using a micro-LED display manufacturing process technology in association with a matrix circuit manufactured by a thin-film transistor manufacturing process technology. Therefore, according to the method for manufacturing the phase shift device of the present aspect, switching elements having a high response speed can be dispersedly formed with respect to a plurality of thin-film transistors constituting a matrix circuit having a large area.

Second Example Embodiment

Next, a planar antenna device according to a second example embodiment will be described with reference to the drawings. The planar antenna device of the present example embodiment has a configuration in which the dielectric layer included in the planar antenna device according to the first example embodiment is changed to a liquid crystal layer. The liquid crystal layer is one form of a dielectric layer included in the planar antenna device according to the first example embodiment. The liquid crystal layer can adjust the dielectric constant according to the control of the applied voltage.

(Configuration)

Figure 12:
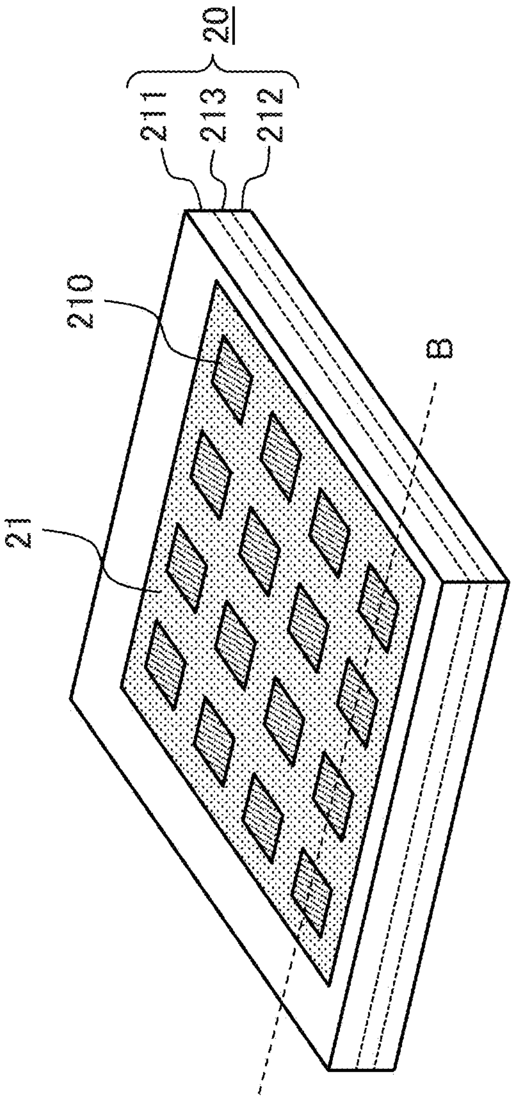
FIG. 12 is a conceptual diagram illustrating an example of an external appearance of a planar antenna device according to a second example embodiment.

FIG. 12 is a conceptual diagram illustrating an example of an external appearance of a planar antenna device 20 according to the present example embodiment. The planar antenna device 20 includes a first substrate 211, a second substrate 212, and a liquid crystal layer 213. The planar antenna device 20 has a structure in which the first substrate 211, the second substrate 212, and the liquid crystal layer 213 are stacked.

The first substrate 211 has a configuration similar to that of the first substrate of the first example embodiment. The first substrate 211 includes a transmission surface of the transmission target radio wave. The patch antenna array 21 is arranged on the first surface (transmission surface) of the first substrate 211. The patch antenna array 21 includes a plurality of patch antennas 210. A ground layer (described later) is formed on the second surface of the first substrate 211 facing the first surface.

The second substrate 212 has a configuration similar to that of the second substrate 112 of the first example embodiment. The second substrate 212 corresponds to a backplane of a liquid crystal display. A matrix circuit is formed on the upper surface of the second substrate 212. The matrix circuit is formed using a TFT process technology. In addition, a signal layer is formed above the matrix circuit. In the signal layer, a phase shift wire constituting a phase shift element, a switch group including a plurality of switching elements, a signal line connecting the phase shift wire, the switch group, and the like are formed. The switching elements are formed using micro-LED process technology.

The liquid crystal layer 213 is sandwiched between the first substrate 211 and the second substrate 212. The liquid crystal layer 213 is filled with liquid crystal molecules (also simply referred to as liquid crystal). The material of the liquid crystal is not particularly limited. The liquid crystal contained in the liquid crystal layer 213 sandwiched between the first substrate 211 and the second substrate 212 is oriented according to the application of a voltage based on the operation principle of the liquid crystal display. As a result, the dielectric constant of the liquid crystal layer 213 changes according to the applied voltage.

An antenna having a function of a phase shifter is formed by sandwiching the liquid crystal layer 213 between the first substrate 211 and the second substrate 212 facing each other. A single antenna (also referred to as an antenna unit) is configured for each patch antenna 210. The function of the phase shifter is expressed for each antenna unit. That is, a phase shift element is configured for each antenna unit.

Figure 13:
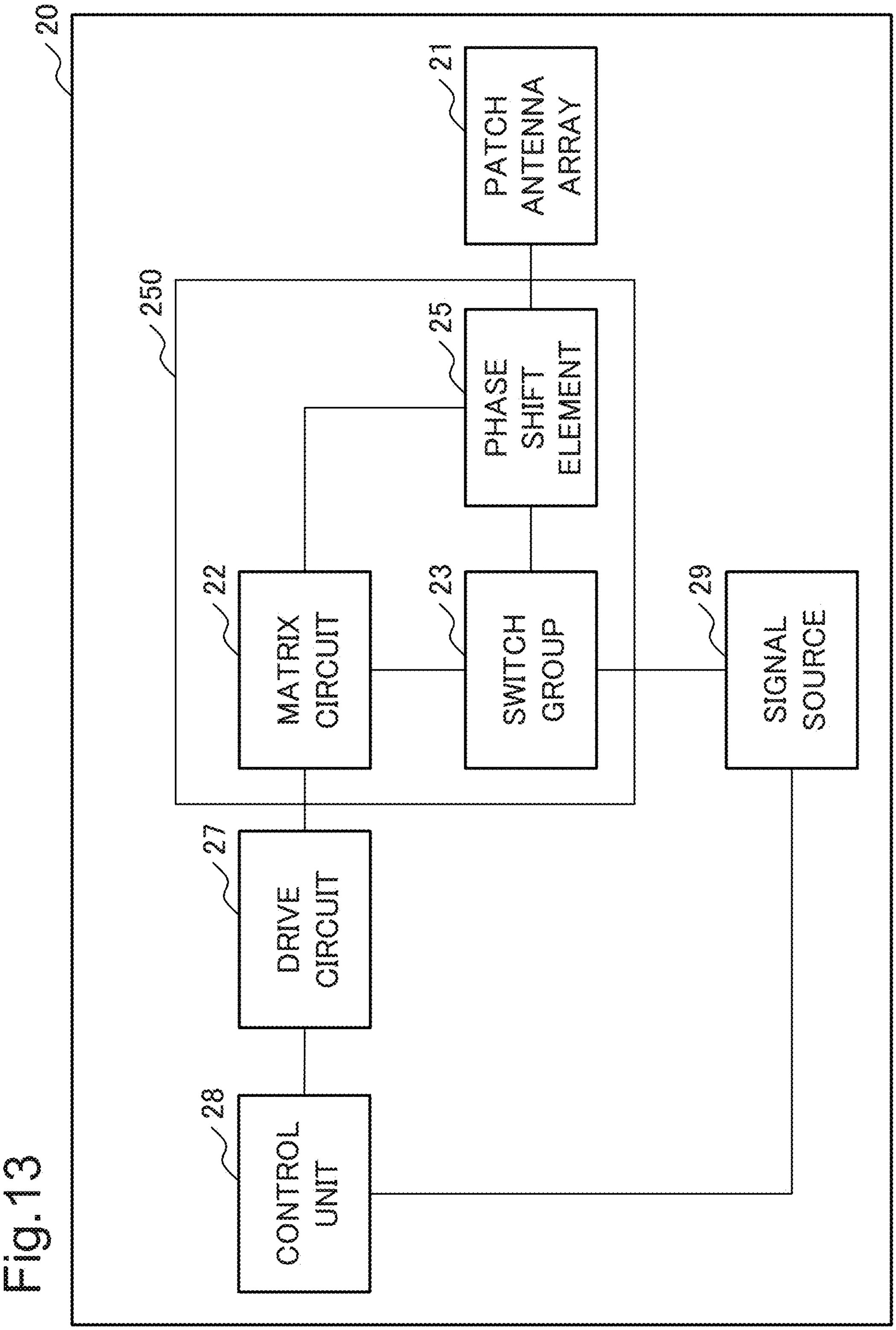
FIG. 13 is a block diagram illustrating an example of a configuration of a planar antenna device according to the second example embodiment.

FIG. 13 is a block diagram illustrating an example of a configuration of the planar antenna device 20. The planar antenna device 20 includes a patch antenna array 21, a matrix circuit 22, a switch group 23, a phase shifter 25, a drive circuit 27, a control circuit 28, and a signal source 29. The matrix circuit 22, the switch group 23, and the phase shifter 25 constitute a phase shift device 250.

The patch antenna array 21 has a configuration similar to that of the patch antenna array 11 of the first example embodiment. The patch antenna array 21 includes a plurality of patch antennas 210. The patch antenna array 21 has a configuration in which a plurality of patch antennas 210 are arrayed in a two-dimensional array. The plurality of patch antennas 210 are arrayed along the X direction and the Y direction orthogonal to each other. The plurality of patch antennas 210 are phased arrayed.

The patch antenna 210 has a configuration similar to that of the patch antenna 110 of the first example embodiment. The patch antenna 210 is a plate-shaped radiation element. In the example of FIG. 12, the patch antenna 210 has a square shape. The shape of the patch antenna 210 is not limited to a square shape, and may be a circular shape or other shapes. The patch antenna 210 is power fed by electromagnetic coupling power feeding method. An opening (also referred to as a slot) is opened in the ground layer below the patch antenna 210. The patch antenna 210 is electromagnetically coupled to a signal line (microstrip line) formed on the upper surface side of the second substrate 212 by way of the slot of the ground layer. The patch antenna 210 is excited by electromagnetically coupling the patch antenna 210 and the microstrip line via the slot. The impedance can be matched by setting a position away from a position immediately below the slot by about ¼ of the wavelength of the transmission target radio wave as an open end of the microstrip line and adjusting the dimension of the slot.

The matrix circuit 22 has a configuration in which a plurality of thin-film transistors (TFT) are arrayed in a two-dimensional array. The matrix circuit 22 is formed on the upper surface of the second substrate 212 using a TFT process technology. A shield layer (described later) is formed above the matrix circuit 22. Each of the plurality of TFTs is associated to any of the plurality of patch antennas 210 constituting the patch antenna array 21. One of the plurality of TFTs associated to one patch antenna 210 is used to apply a voltage to a part of the liquid crystal material included in the liquid crystal layer 213. For example, the TFT includes a semiconductor layer such as amorphous silicon or polysilicon.

The switch group 23 has a configuration similar to that of the switch group 13 of the first example embodiment. The switch group 23 includes a plurality of switching elements. The plurality of switching elements are formed above the region where the matrix circuit 22 is formed using a micro-LED process technology (device transfer technology). The plurality of switching elements are connected to signal lines and phase shift wires included in a signal layer formed above a shield layer (described later). Any one of the plurality of TFTs is connected to each of the plurality of switching elements. A plurality of phase shift wires constituting a phase shift element of each antenna unit is arranged between the TFTs associated to the patch antennas 210.

The phase shifter 25 includes a phase shift element formed for each antenna unit. The phase shift element of each antenna unit includes a plurality of phase shift wires. The plurality of phase shift wires are arranged in parallel. End portions of the plurality of phase shift wires are connected to any switch included in the switch group 23. A phase shift condition of the phase shift element for each antenna unit is set by switching the connection state of the plurality of phase shift wires. One of the switches constituting the switch group 23 is connected to both ends of each phase shift wire. At least one phase shift wire of the plurality of phase shift wires is selected by turning ON/OFF the switches connected to both ends of each phase shift wire.

The drive circuit 27 has a configuration similar to that of the drive circuit 17 of the first example embodiment. The drive circuit 27 drives the plurality of TFTs configuring the matrix circuit 22 under the control of the control circuit 28. The drive circuit 27 individually drives the plurality of TFTs arrayed in a two-dimensional array. The drive circuit 27 applies a voltage to the liquid crystal material of the liquid crystal layer 213 under the control of the control circuit 28.

The control circuit 28 has a configuration similar to that of the control circuit 18 of the first example embodiment. The control circuit 28 performs control to drive the drive circuit 27 in accordance with a control signal from the outside. The control circuit 28 drives the drive circuit 27 by an active matrix drive system. In addition, the control circuit 28 outputs a control signal from the outside to the signal source 29. For example, the control circuit 28 is achieved by a microcomputer or a microcontroller. For example, the control circuit 28 includes a central processing unit (CPU), a random access memory (RAM), a read only memory (ROM), a flash memory, and the like. The control circuit 28 executes control and process corresponding to a program stored in advance. The control circuit 28 executes control and process corresponding to a program according to a preset schedule and timing, an external control instruction, and the like.

The signal source 29 is connected to a plurality of switching elements constituting the switch group 23. In addition, the signal source 29 is connected to the control circuit 28. The signal source 29 acquires a control signal from the control circuit 28. The signal source 29 controls ON/OFF of the plurality of switching elements constituting the switch group 23 according to the control signal. The signal source 29 may be configured to directly receive a control signal from the outside without passing through the control circuit 28.

Figure 14:
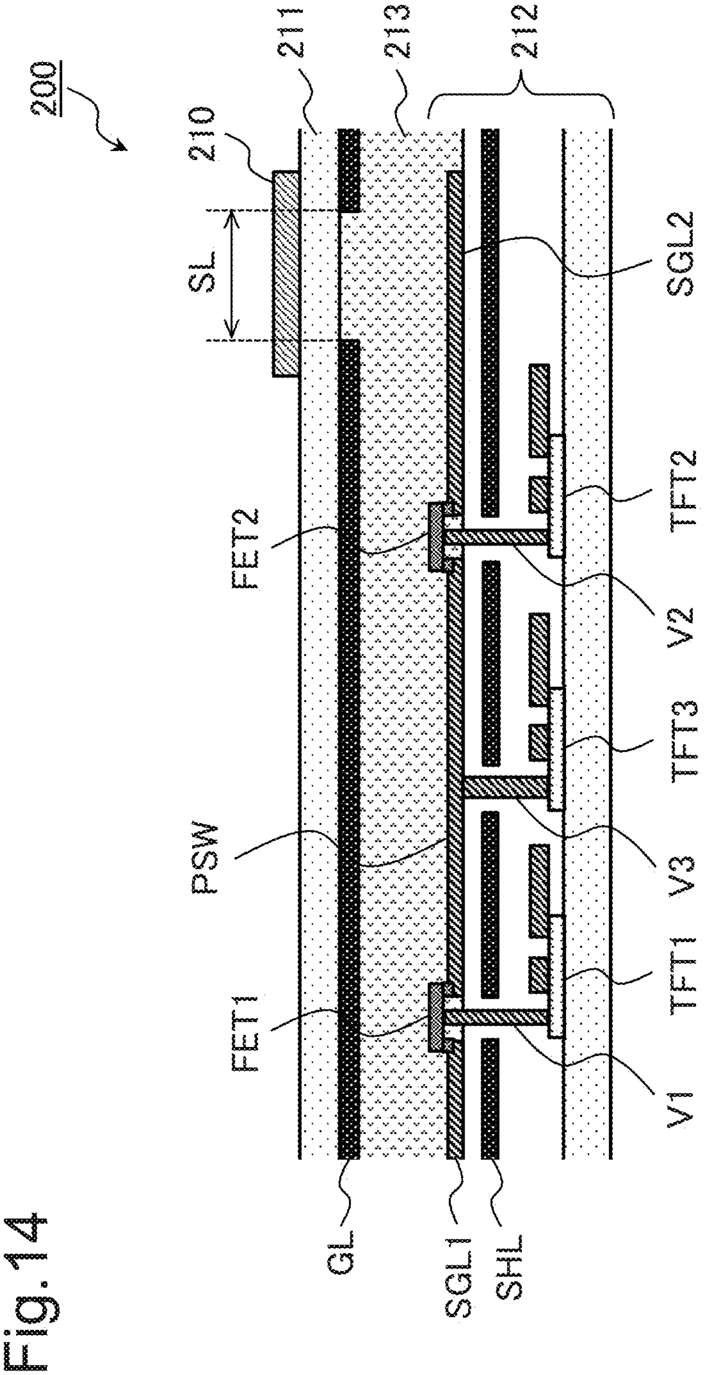
FIG. 14 is a conceptual diagram for describing an antenna unit constituting a patch antenna array included in the planar antenna device according to the second example embodiment.

FIG. 14 is a conceptual diagram for describing an antenna unit 200 constituting the patch antenna array 21. FIG. 14 is a cross-sectional view of a part of the planar antenna device 20 taken along line B-B in FIG. 12. FIG. 14 illustrates an example in which the switch is achieved by an FET.

On the second substrate 212, a plurality of TFTs (TFT1, TFT2, TFT3) are formed for each antenna unit 200. The TFT1, TFT2 and the TFT3 constituting the matrix circuit 22 are formed on the upper surface of the second substrate 212 using a liquid crystal display manufacturing process. The TFT1 is also referred to as a first thin-film transistor. The TFT2 is also referred to as a second thin-film transistor. The TFT3 is also referred to as a third thin-film transistor. For example, the upper side of the matrix circuit 22 is covered with an insulating layer. An air gap may be formed above the matrix circuit 22.

A shield layer SHL is formed on the second substrate 212. The shield layer SHL is formed to prevent electromagnetic coupling of above and below the shield layer. For example, the shield layer SHL is made of a conductor. The potential of the shield layer SHL is basically a ground potential. Therefore, a capacitance corresponding to the dielectric constant of the liquid crystal layer 213 is formed between the shield layer SHL and the phase shift wire PSW.

A signal layer is formed above the shield layer SHL. The signal layer includes a signal line SGL1, a phase shift wire PSW, and a signal line SGL2. A signal from the signal source 29 is input to the signal line SGL1 (also referred to as a first signal line). When the connected switching element (FET1/FET2) is in the ON state, the signal input to the signal line SGL1 propagates to the phase shift wire PSW and the signal line SGL2 (also referred to as a second signal line). The dielectric constant of the liquid crystal layer 213 between the signal layer and the ground layer GL changes according to the voltage applied to the TFT3. The phase shift amount of the phase shift wire PSW changes according to the dielectric constant of the liquid crystal layer 213. That is, the phase shift amount of the phase shift wire PSW can be controlled according to the applied voltage of the TFT3.

A through hole for connecting the TFT1 and the FET1 and a through hole for connecting the TFT2 and the FET2 are formed in the shield layer SHL. In addition, a through hole for connecting the TFT3 and the phase shift wire PSW is formed in the shield layer SHL. The through hole (via hole) is formed below the FET1 and the FET2 and above the TFT3. The TFT1 and the FET1 are electrically connected by a via V1. The TFT2 and the FET2 are electrically connected by a via V2. The TFT3 and the phase shift wire PSW are electrically connected by a via V3.

The FET1 (also referred to as a first switching element) is formed at the upper part of the through hole on the left side of the three through holes opened in the shield layer SHL. The FET2 (also referred to as a second switching element) is formed at the upper part of the through hole on the right side of the three through holes opened in the shield layer SHL. The FET1 and the FET2 constituting the switch group 23 are formed using the device transfer technology of the micro-LED process technology. For example, the FET1 and the FET2 are transferred to above the signal line SGL1, the signal line SGL2, the phase shift wire PSW, the via V1, and the via V2 by using the device transfer technology.

The TFT1 is connected to the gate electrode of the FET1 through a through hole (left side) opened in the shield layer SHL. The TFT3 is connected to the gate electrode of the FET2 through a through hole (right side) opened in the shield layer SHL. The TFT3 is connected to the phase shift wire PSW through a through hole (center) opened in the shield layer SHL.

A first end (left side in FIG. 14) and a second end (right side in FIG. 14) corresponding to a source or a drain are formed at both end portions of the channel of the FET1. A first end (right side) of the channel of the FET1 is connected to a first end (left side) of the phase shift wire PSW included in the phase shifter 25. A second end (left side) of the channel of the FET1 is connected to one end of the signal line SGL1. The other end of the signal line SGL1 is connected to the signal source 29.

A first end (left side in FIG. 14) and a second end (right side in FIG. 14) corresponding to a source or a drain are formed at both end portions of the channel of the FET2. A first end (left side) of the channel of the FET2 is connected to a second end (right side) of the phase shift wire PSW included in the phase shifter 25. A second end (right side) of the channel of the FET2 is connected to one end of the signal line SGL2. The other end of the signal line SGL2 extends beyond the lower region of the patch antenna 210. The signal line SGL2 functions as a microstrip line.

The liquid crystal layer 213 is disposed above the signal layer including the switch group 23. The first substrate 211 is disposed above liquid crystal layer 213. The patch antenna 210 is disposed on the upper surface of the first substrate 211. In the example of FIG. 14, the patch antenna 210 is arranged on the right side of the upper surface of the first substrate 211. A ground layer GL is formed on the lower surface of the first substrate 211. A slot SL is opened in the ground layer GL below the patch antenna 210. The patch antenna 210 and the signal line SGL2 (microstrip line) are electromagnetically coupled through the slot SL.

The signal reaching the phase shift wire PSW through the signal line SGL1 is phase-shifted by a phase shift amount corresponding to the dielectric constant of the liquid crystal layer 213 by the voltage applied by the TFT3. The signal phase shifted by the phase shift wire PSW is transmitted as a radio wave in a wavelength band to be transmitted by electromagnetic induction between the signal line SGL2 and the patch antenna 210.

The radio wave received by the patch antenna 210 is received according to the dielectric constant of the liquid crystal layer 213 between the patch antenna 210 and the signal line SGL2. The received radio wave is phase shifted by the phase shift wire PSW. The phase shifted signal is received by a reception circuit (not illustrated) through the signal line SGL1. Information included in the signal received by the reception circuit is decoded by a decoder (not illustrated). The information included in the signal is not particularly limited.

The phase shift element configured by the plurality of phase shift wires PSW has a structure similar to that of the pixel of the liquid crystal display, and operates similarly. In a liquid crystal display, a voltage applied to a pixel electrode according to switching of a TFT is maintained for one frame by a storage capacitance. In the planar antenna device 20 of the present example embodiment, a voltage is applied to the phase shift wire PSW according to the switching of the TFT.

The voltage applied to the phase shift wire PSW is maintained for one frame by a capacitance formed between the phase shift wire PSW and the shield layer SHL. That is, the shield layer SHL has two roles. The first role is to prevent interference between the signal layer and the TFT circuit. The second role is to form a capacitance between the phase shift wire PSW and the shield layer SHL.

The plurality of switching elements (FET) included in the switch group 23 are formed using a device transfer technology of a micro-LED process technology. The switching element can be mounted in the gap of the liquid crystal since the switching element can be formed with a thickness of equal to or less than 1 μm (micrometer) by using the device transfer technology of the micro-LED process technology.

[Phase Shift Element]

Next, a phase shift element configuring the phase shifter 25 included in the planar antenna device 20 will be described with reference to the drawings. Hereinafter, the phase shift element of each antenna unit 200 will be described with some examples.

First Example

Figure 15:
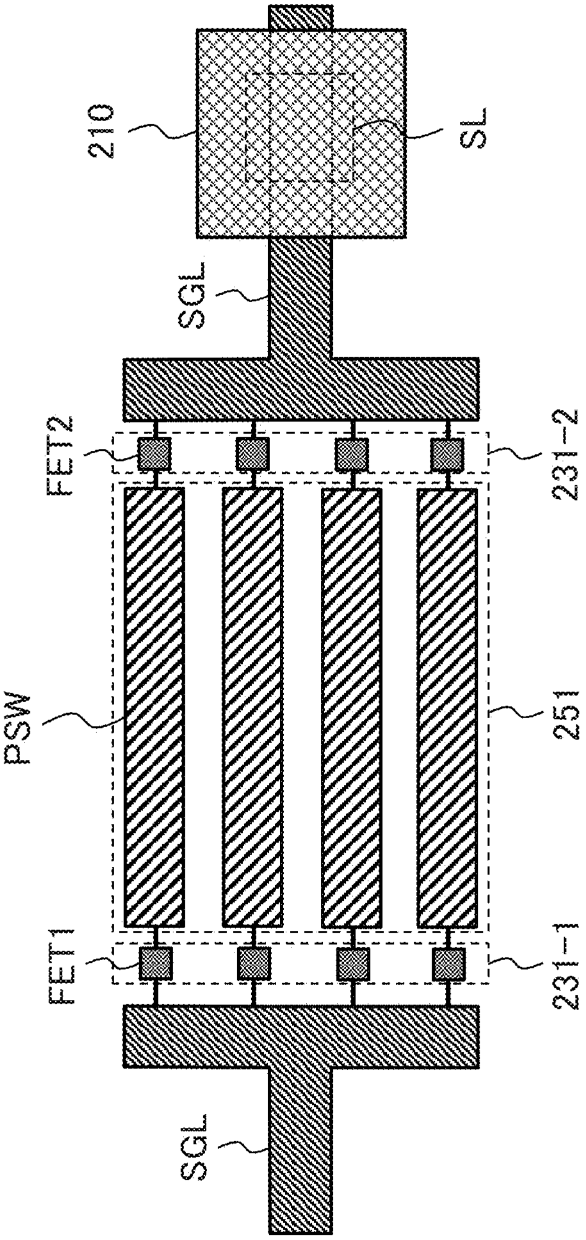
FIG. 15 is a conceptual diagram for explaining a first example of a phase shift element included in the planar antenna device according to the second example embodiment.

FIG. 15 is a conceptual diagram for explaining a first example (phase shift element 251) of a phase shift element included in the planar antenna device 20. FIG. 15 is a view of a range including the phase shift element 251 as viewed from an upper viewpoint. The dielectric constant of the liquid crystal layer 213 included in the planar antenna device 20 is adjusted according to the voltage applied to the TFT 233. The phase shift element 251 of the first example can set a desired phase shift amount by selecting one of the phase shift wires PSW to which different voltages are applied.

The phase shift element 251 of the first example includes four phase shift wires PSW having the same line length. A voltage is individually applied to each of the four phase shift wires PSW. The phase shift amount of the phase shift wire PSW is set according to the voltage to be applied. The phase shift amount of the phase shift wire PSW is set in accordance with the wavelength of the transmission target radio wave. For example, a plurality of phase shift wires PSW may be selected from the four phase shift wires PSW to set the phase shift amount. For example, the same voltage may be applied to the four phase shift wires PSW, and the phase shift amount may be set according to the selected number of the phase shift wires PSW.

The first end (left side) of the plurality of phase shift wires PSW is connected to any of the FETs 1 included in the switch group 231-1. The FET1 included in the switch group 231-1 is connected to one end (right side) of the signal line SGL1. The second end (right side) of the phase shift wire PSW is connected to any of the FETs 2 included in the switch group 231-2. The FET2 included in the switch group 231-2 is connected to one end (left side) of the signal line SGL2. The other end (right side) of the signal line SGL2 extends beyond the lower side of the slot SL opened in association with the patch antenna 210.

The phase shift amount of the phase shift wire PSW connected to the FET1 and the FET2 set to the ON state according to the control signal from the signal source 29 is set as the phase shift amount of the phase shift element 251. A signal reaching the signal line SGL2 below the slot SL via the phase shift wire PSW connected to the FET1 and the FET2 in the ON state is transmitted as a radio wave by inductive resonance between the patch antenna 210 and the signal line SGL2. In the case of the structure of FIG. 15, since a response delay in the liquid crystal layer 213 does not occur, the phase can be switched at high speed. Furthermore, in the case of the structure of FIG. 15, the phase shift amount of the phase shift element 251 can be set to an appropriate value according to the situation by adjusting the voltage applied to the plurality of phase shift wires PSW and selecting at least one of the phase shift wires PSW.

Second Example

Figure 16:
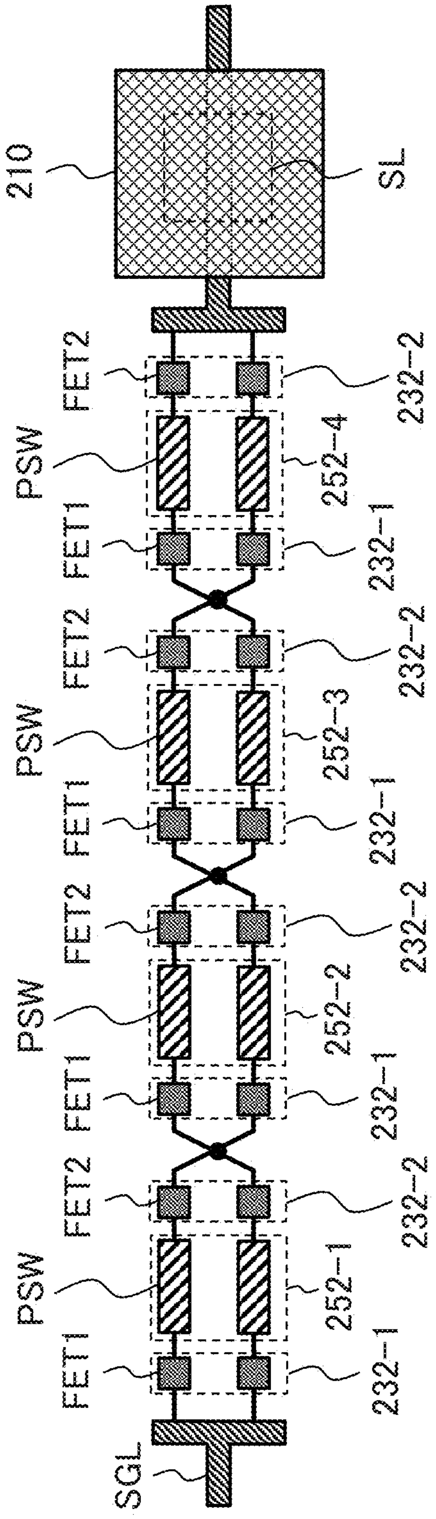
FIG. 16 is a conceptual diagram for explaining a second example of a phase shift element included in the planar antenna device according to the second example embodiment.

FIG. 16 is a conceptual diagram for explaining a second example (phase shift element 252) of a phase shift element included in the planar antenna device 20. FIG. 16 is a view of a range including the phase shift element 252 as viewed from an upper viewpoint. The phase shift element 252 is a 4-bit phase shift element in which four phase shift elements 252-1 to 252-4 are connected in series. The phase shift element 252 of the second example can control the phase shift amount by selecting the phase shift wire PSW for each phase shift element 252-1 to 252-4 with respect to the phase shift elements 252-1 to 252-4 to which voltages are individually applied.

The phase shift element 252 of the second example includes four phase shift elements 252-1 to 252-4. The four phase shift elements 252-1 to 252-4 are connected in series. The line lengths of the four phase shift elements 252-1 to 252-4 are equal. The phase shift amounts of the four phase shift elements 252-1 to 252-4 can be adjusted by controlling the applied voltage using the TFT3 associated to each of the four phase shift elements 252-1 to 252-4.

A first end (left side) of the phase shift wire PSW in the upper stage is connected to the FET1 in the upper stage included in the switch group 232-1 connected to each of the phase shift elements 252-1 to 252-4. A first end (left side) of the phase shift wire PSW in the lower stage is connected to the FET1 in the lower stage included in the switch group 232-1 connected to each of the phase shift elements 252-1 to 252-4. The FET1 included in the switch group 232-1 connected to the phase shift element 252-1 is connected to one end (right side) of the signal line SGL1. The FET1 included in the switch group 232-1 connected to each of the phase shift elements 252-2 to 252-4 is connected to the FET2 included in the switch group 232-2 connected to each of the left adjacent phase shift elements 252-1 to 252-3.

A second end (right side) of the phase shift wire PSW in the upper stage is connected to the FET2 in the upper stage included in the switch group 232-2 connected to each of the phase shift elements 252-1 to 252-4. A second end (right side) of the phase shift wire PSW in the lower stage is connected to the FET2 in the lower stage included in the switch group 232-2 connected to each of the phase shift elements 252-1 to 252-4. The FET2 included in the switch group 232-2 connected to each of the phase shift elements 252-1 to 252-3 is connected to the FET1 included in the switch group 232-1 connected to each of the left adjacent phase shift elements 252-2 to 252-4. The FET2 included in the switch group 232-2 connected to the phase shift element 252-4 is connected to one end (left side) of the signal line SGL2. The other end (right side) of the signal line SGL2 extends beyond the lower side of the slot SL opened in association with the patch antenna 210.

The phase shift amount of the phase shift wire PSW connected to the FET1 and the FET2 set to the ON state according to the control signal from the signal source 29 is set as the phase shift amount for each phase shift element 252-1 to 252-4. The total value of the phase shift amounts for each phase shift element 252-1 to 252-4 corresponds to the entire phase shift amount of the phase shift element 252.

A signal reaching the signal line SGL2 below the slot SL via the phase shift wire PSW connected to the FET1 and the FET2 in the ON state is transmitted as a radio wave by inductive resonance between the patch antenna 210 and the signal line SGL2. In the case of the structure of FIG. 16, since a response delay in the liquid crystal layer 213 does not occur, the phase can be switched at high speed.

In the case of the structure of FIG. 16, the phase shift amount of the phase shift element 252 can be set to an appropriate value by selecting the phase shift wire PSW according to the situation. It is assumed that the phase shift amount of the phase shift wire PSW arranged in the upper stage of each of the phase shift elements 252-2 to 252-4 is twice the phase shift amount of the phase shift wire PSW arranged in the upper stage of each of the left adjacent phase shift elements 252-1 to 252-3. It is assumed that the phase shift amount of the phase shift wire PSW arranged in the lower stage of each of the phase shift elements 252-1 to 252-4 is sufficiently small with respect to the phase shift amount of the phase shift wire PSW arranged in the upper stage of the phase shift element 252-1. In such a case, the entire phase shift amount of the phase shift element 252 can be digitally controlled according to the way of selecting the phase shift wire PSW included in the phase shift elements 252-1 to 252-4. In addition, the entire phase shift amount of the phase shift element 252 can be nonlinearly controlled by controlling the voltage to be applied to the liquid crystal layer 213 via the TFT223.

Third Example

Figure 17:
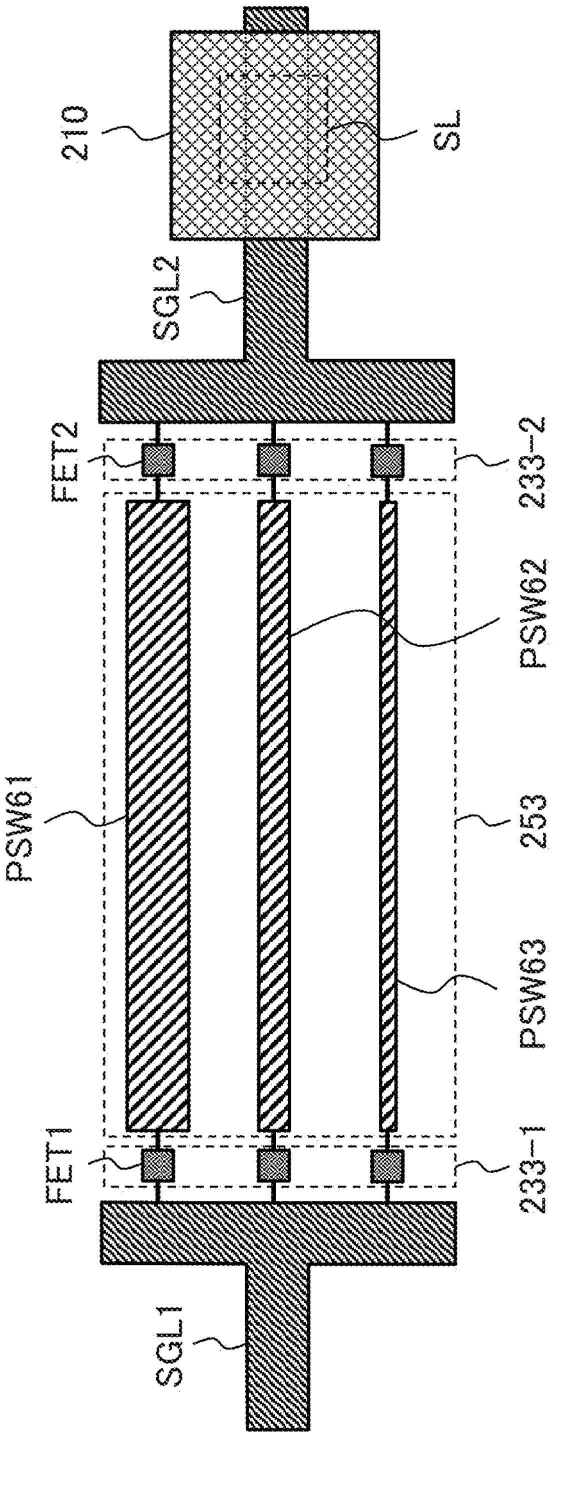
FIG. 17 is a conceptual diagram for explaining a third example of a phase shift element included in the planar antenna device according to the second example embodiment.

FIG. 17 is a conceptual diagram for explaining a third example (phase shift element 253) of a phase shift element included in the planar antenna device 20. FIG. 17 is a view of a range including the phase shift element 253 as viewed from an upper viewpoint. The phase shift element 253 of the third example sets an appropriate phase shift amount with respect to the frequency of the transmission target radio wave by selecting one of the phase shift wires PSW having different line widths.

The phase shift element 253 of the third example includes a plurality of phase shift wires (PSW61, PSW62, PSW63) having different line widths. The phase shift wire PSW61 has a line width thicker than that of the phase shift wire PSW62. The phase shift wire PSW62 has a line width thicker than that of the phase shift wire PSW63. The thicknesses of the phase shift wire PSW61, the phase shift wire PSW62, and the phase shift wire PSW63 are set in accordance with the wavelength of the transmission target radio wave.

The first end (left side) of the phase shift wire PSW61 is connected to the FET1 in the upper stage included in the switch group 233-1. The first end (left side) of the phase shift wire PSW62 is connected to the FET1 in the middle stage included in the switch group 233-1. The first end (left side) of the phase shift wire PSW63 is connected to the FET1 in the lower stage included in the switch group 233-1. The FET1 included in the switch group 233-1 is connected to one end (right side) of the signal line SGL1. The second end (right side) of the phase shift wire PSW61 is connected to the FET2 in the upper stage included in the switch group 233-2. The second end (right side) of the phase shift wire PSW62 is connected to the FET2 in the middle stage included in the switch group 233-2. The second end (right side) of the phase shift wire PSW63 is connected to the FET2 in the lower stage included in the switch group 233-2. The FET2 included in the switch group 233-2 is connected to one end (left side) of the signal line SGL2. The other end (right side) of the signal line SGL2 extends beyond the lower side of the slot SL opened in association with the patch antenna 210.

The phase shift amount of the phase shift wire PSW connected to the FET1 and the FET2 set to the ON state according to the control signal from the signal source 29 is set as the phase shift amount of the phase shift element 253. A signal reaching the signal line SGL2 below the slot SL via the phase shift wire PSW connected to the FET1 and the FET2 in the ON state is transmitted as a radio wave by inductive resonance between the patch antenna 210 and the signal line SGL2. In the case of the structure of FIG. 17, since a response delay in the liquid crystal layer 213 does not occur, the phase of the signal to be transmitted can be switched at high speed. Furthermore, in the case of the structure of FIG. 17, an appropriate phase shift amount can be set for the frequency of the transmission target radio wave by selecting the phase shift wire PSW according to the situation.

As described above, the planar antenna device of the present example embodiment includes a first substrate, a dielectric layer, and a second substrate. The patch antenna is disposed on the upper surface of the first substrate. A ground layer in which a slot is formed in a lower region of the patch antenna is disposed on the lower surface of the first substrate. The dielectric layer is disposed such that the upper surface comes into contact with the ground layer disposed on the lower surface of the first substrate. The dielectric layer is a liquid crystal layer filled with liquid crystal molecules. The second substrate is disposed in contact with the lower surface of the dielectric layer. The second substrate includes a matrix circuit, a first signal line, a phase shift wire, a second signal line, and a switch group. The matrix circuit includes a transistor pair including a first thin-film transistor and a second thin-film transistor. The matrix circuit includes a third thin-film transistor electrically connected to the plurality of phase shift wires. The first signal line is formed on the upper surface of the second substrate and receives a signal to be transmitted. The phase shift element is formed on the upper surface of the second substrate and is configured by a plurality of phase shift wires. The second signal line is formed on the upper surface of the second substrate, is disposed below the slot, and is electromagnetically coupled to the patch antenna through the slot. The switch group includes a first switching element and a second switching element formed using a manufacturing process technology of a micro-LED display. In the first switching element, a first end of a channel is connected to one end of any of the plurality of phase shift wires, and a control electrode is connected to the first thin-film transistor. In the second switching element, a first end of a channel is connected to the other end of any of the plurality of phase shift wires, and a control electrode is connected to the second thin-film transistor.

In the present example embodiment, the phase shift amount is not set according to the length of the phase shift wire, but the phase shift amount is set according to the voltage applied to the phase shift wire. Therefore, according to the present example embodiment, the phase shifter can be miniaturized as compared with the first example embodiment. Furthermore, in the present example embodiment, more flexible phase shift setting can be performed as compared with the first example embodiment by controlling the voltage applied to the phase shift wire according to the situation.

In a general planar antenna device using a liquid crystal, a TFT is used only for changing a dielectric constant of the liquid crystal. In the present example embodiment, the TFT is also used for switching of a switching element capable of high-speed operation, such as an FET, mounted using a manufacturing process technology (device transfer technology) of a micro-LED display. Therefore, according to the present example embodiment, since the switching element capable of high-speed operation is used, the phase shift can be switched at high speed.

In one aspect of the present example embodiment, the phase shift element has a structure in which a plurality of phase shift wires having different line widths are arranged in parallel. According to the present aspect, an appropriate phase shift amount can be set for the frequency of the transmission target radio wave by selecting the phase shift wire according to the situation.

Third Example Embodiment

Next, a phase shift device according to a third example embodiment will be described with reference to the drawings. The phase shift device of the present example embodiment has a simplified configuration of the phase shift device included in the planar antenna devices according to the first and second example embodiments.

Figure 18:
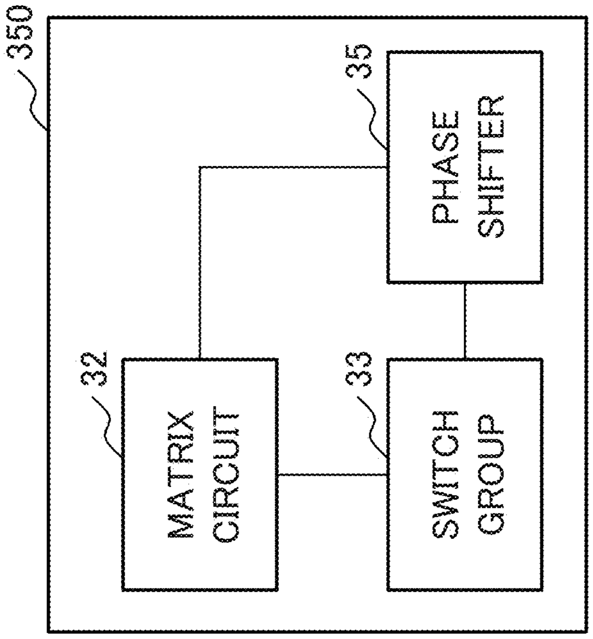
FIG. 18 is a block diagram illustrating an example of a configuration of a phase shift device according to the second example embodiment.

FIG. 18 is a block diagram illustrating an example of a configuration of a phase shift device 350 of the present example embodiment. The phase shift device 350 includes a matrix circuit 32, a switch group 33, and a phase shifter 35.

The matrix circuit 32 includes a transistor pair including a first thin-film transistor and a second thin-film transistor. The phase shifter 35 includes a plurality of phase shift wires. The switch group 33 includes a first switching element and a second switching element formed using a micro-LED display manufacturing process technology. The first end of the channel of the first switching element is connected to one of the plurality of phase shift wires. A control electrode of the first switching element is connected to the first thin-film transistor. The first end of the channel of the second switching element is connected to the other end of one of the plurality of phase shift wires. A control electrode of the second switching element is connected to the second thin-film transistor.

Since the phase shift device of the present example embodiment does not include the liquid crystal layer, a response delay in the liquid crystal layer does not occur. Therefore, the phase shift device of the present example embodiment can switch the phase of the signal to be transmitted at high speed as compared with a general phase shift device using liquid crystal. In addition, since the phase shift device of the present example embodiment has a large gain as compared with a general phase shift device, a sufficient bandwidth can be secured. That is, according to the phase shift device of the present example embodiment, the phase of the signal to be transmitted can be switched at high speed while securing a sufficient bandwidth.

(Hardware)

Here, a hardware configuration for executing control and process according to each example embodiment of the present disclosure will be described using an information processing device 90 of FIG. 19 as an example. The information processing device 90 in FIG. 19 is a configuration example for executing control and process of each example embodiment, and does not limit the scope of the present disclosure.

Figure 19:
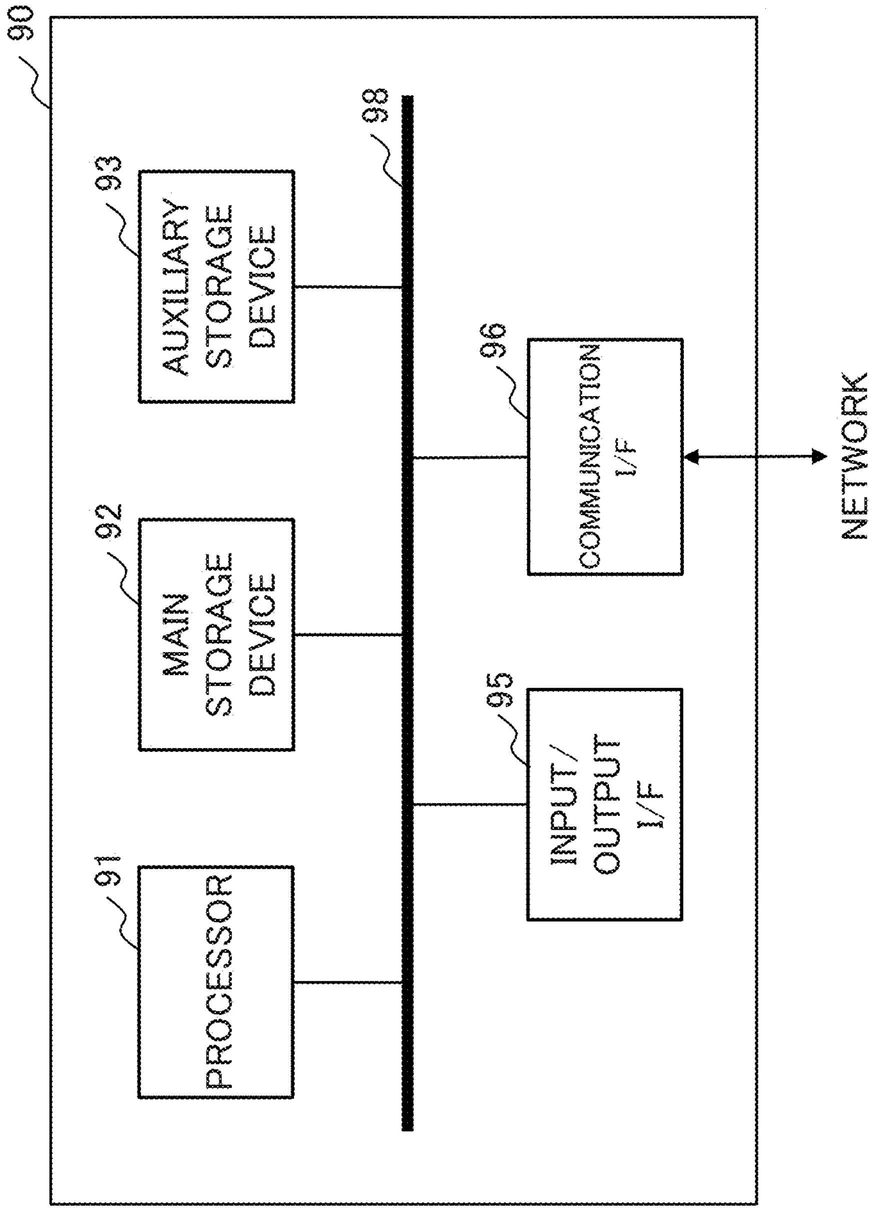
FIG. 19 is a block diagram illustrating an example of a hardware configuration that executes control and process according to each example embodiment.

As illustrated in FIG. 19, the information processing device 90 includes a processor 91, a main storage device 92, an auxiliary storage device 93, an input/output interface 95, and a communication interface 96. In FIG. 19, the interface is abbreviated as an interface (I/F). The processor 91, the main storage device 92, the auxiliary storage device 93, the input/output interface 95, and the communication interface 96 are connected to each other via a bus 98 in such a way as to be able to communicate data. In addition, the processor 91, the main storage device 92, the auxiliary storage device 93, and the input/output interface 95 are connected to a network such as the Internet or an intranet via the communication interface 96.

The processor 91 develops the program stored in the auxiliary storage device 93 or the like in the main storage device 92. The processor 91 executes the program developed in the main storage device 92. In the present example embodiment, a configuration of using a software program installed in the information processing device 90 may be adopted. The processor 91 executes control and process according to each example embodiment.

The main storage device 92 has an area in which a program is developed. A program stored in the auxiliary storage device 93 or the like is developed in the main storage device 92 by the processor 91. The main storage device 92 is achieved by, for example, a volatile memory such as a dynamic random access memory (DRAM). In addition, a nonvolatile memory such as a magnetoresistive random access memory (MRAM) may be configured/added as the main storage device 92.

The auxiliary storage device 93 stores various data such as programs. The auxiliary storage device 93 is achieved by a local disk such as a hard disk or a flash memory. Various data may be stored in the main storage device 92, and the auxiliary storage device 93 may be omitted.

The input/output interface 95 is an interface for connecting the information processing device 90 and a peripheral device based on a standard or a specification. The communication interface 96 is an interface for connecting to an external system or device through a network such as the Internet or an intranet based on a standard or a specification. The input/output interface 95 and the communication interface 96 may be shared as an interface to connect to an external device.

Input devices such as a keyboard, a mouse, and a touch panel may be connected to the information processing device 90 as necessary. These input devices are used to input information and settings. When the touch panel is used as the input device, the display screen of the display device may also serve as the interface of the input device. Data communication between the processor 91 and the input device may be mediated by the input/output interface 95.

Furthermore, the information processing device 90 may be provided with a display device for displaying information. In a case where a display device is provided, the information processing device 90 preferably includes a display control device (not illustrated) for controlling display of the display device. The display device may be connected to the information processing device 90 via the input/output interface 95.

Furthermore, the information processing device 90 may be provided with a drive device. The drive device mediates reading of data and a program from a recording medium, writing of a processing result of the information processing device 90 to the recording medium, and the like between the processor 91 and the recording medium (program recording medium). The display device may be connected to the information processing device 90 via the input/output interface 95.

The above is an example of a hardware configuration for enabling control and process according to each example embodiment of the present invention. The hardware configuration of FIG. 19 is an example of a hardware configuration for executing control and process according to each example embodiment, and does not limit the scope of the present invention. In addition, a program for causing a computer to execute control and process according to each example embodiment is also included in the scope of the present invention. Furthermore, a program recording medium in which the program according to each example embodiment is recorded is also included in the scope of the present invention. The recording medium can be achieved by, for example, an optical recording medium such as a compact disc (CD) or a digital versatile disc (DVD). The recording medium may be achieved by a semiconductor recording medium such as a universal serial bus (USB) memory or a secure digital (SD) card. Furthermore, the recording medium may be achieved by a magnetic recording medium such as a flexible disk, or another recording medium. When a program executed by the processor is recorded in a recording medium, the recording medium corresponds to a program recording medium.

The components of each example embodiment may be arbitrarily combined. In addition, the components of each example embodiment may be achieved by software or may be achieved by a circuit.

Although the present invention has been described with reference to the example embodiments, the present invention is not limited to the above example embodiments. Various modifications that can be understood by those skilled in the art can be made to the configuration and details of the present invention within the scope of the present invention.

REFERENCE SIGNS LIST

- 10, 20 planar antenna device
- 11, 21 patch antenna array
- 12, 22, 32 matrix circuit
- 13, 23, 33 switch group
- 15, 25, 35 phase shifter
- 17, 27 drive circuit
- 18, 28 control circuit
- 19, 29 signal source
- 110, 210 patch antenna
- 111, 211 first substrate
- 112, 212 second substrate
- 113 dielectric layer
- 131, 132, 133, 134, 135, 231, 232, 233 switch group
- 150, 250, 350 phase shift device
- 151, 152, 153, 154, 155, 251, 252, 253 phase shift element
- 171 first drive circuit
- 172 second drive circuit
- 213 liquid crystal layer

What is claimed is:

1. A planar antenna device comprising:
a first substrate on which a patch antenna is disposed on an upper surface, and a ground layer in which a slot is formed in a lower region of the patch antenna is disposed on a lower surface;
a dielectric layer disposed such that an upper surface comes into contact with the ground layer disposed on the lower surface of the first substrate; and
a second substrate disposed in contact with a lower surface of the dielectric layer; wherein
the second substrate includes
a matrix circuit including a transistor pair configured by a first thin-film transistor and a second thin-film transistor,
a first signal line that is formed on an upper surface of the second substrate and to which a signal to be transmitted is input,
a phase shift element formed on an upper surface of the second substrate, the phase shift element including a plurality of phase shift wires,
a second signal line formed on the upper surface of the second substrate, disposed below the slot, and electromagnetically coupled to the patch antenna via the slot, and
a switch group including a first switching element having a first end of a channel connected to one end of any of the plurality of phase shift wires and a control electrode connected to the first thin-film transistor; and a second switching element having a first end of a channel connected to the other end of any of the plurality of phase shift wires and a control electrode connected to the second thin-film transistor.

2. The planar antenna device according to claim 1, wherein
the phase shift element has a structure in which the plurality of phase shift wires having different line lengths are arranged in parallel.

3. The planar antenna device according to claim 1, wherein
the phase shift element has a structure in which a plurality of pairs in which two phase shift wires having different line lengths are arranged in parallel are connected in series, and
the phase shift wire having a longer line length of the plurality of pairs has a U-shape in which one end is connected to a first end of the first switching element and the other end is connected to a first end of the second switching element.

4. The planar antenna device according to claim 1, wherein
the phase shift element has a structure in which a plurality of pairs in which two phase shift wires having different line lengths are connected in parallel are connected in series, and
the phase shift wire having a longer line length of the plurality of pairs has an I-shape in which one end is connected to a first end of the first switching element and a first end of the second switching element, and the other end is an open end.

5. The planar antenna device according to claim 3, wherein
the phase shift elements adjacent to each other have the phase shift wire having a longer line length arranged at a position on a side opposite to a straight line connecting the first signal line and the second signal line.

6. The planar antenna device according to claim 3, wherein
an electromagnetic interference reduction structure configured by a plurality of vias electrically connecting the upper surface of the second substrate and the ground layer is formed between the phase shift wires adjacent to each other and having a longer line length at a position on the same side with respect to a straight line connecting the first signal line and the second signal line.

7. The planar antenna device according to claim 1, wherein the dielectric layer is a liquid crystal layer filled with liquid crystal molecules, and the matrix circuit includes a third thin-film transistor electrically connected to the plurality of phase shift wires.

8. The planar antenna device according to claim 7, wherein the phase shift element has a structure in which the plurality of phase shift wires having different line widths are arranged in parallel.

9. A phase shift device comprising:

a matrix circuit including a transistor pair configured by a first thin-film transistor and a second thin-film transistor;

a phase shift element including a plurality of phase shift wires; and a switch group including a first switching element having a first end of a channel connected to one end of any of the plurality of phase shift wires and a control electrode connected to the first thin-film transistor; and a second switching element having a first end of a channel connected to the other end of any of the plurality of phase shift wires and a control electrode connected to the second thin-film transistor.

10. A method for manufacturing a phase shift device comprising:

forming a matrix circuit including a transistor pair configured by a first thin-film transistor and a second thin-film transistor using a thin-film transistor manufacturing process technology;

forming a phase shift element including a plurality of phase shift wires above the matrix circuit; and forming a switch group including a first switching element having a first end of a channel connected to one end of any of the plurality of phase shift wires and a control electrode connected to the first thin-film transistor; and a second switching element having a first end of a channel connected to the other end of any of the plurality of phase shift wires and a control electrode connected to the second thin-film transistor using a micro-LED display manufacturing process technology.

* * * * *